(12) United States Patent
Matsuura et al.

(10) Patent No.: US 9,809,203 B2
(45) Date of Patent: Nov. 7, 2017

(54) VEHICLE

(71) Applicant: HONDA MOTOR CO., LTD., Tokyo (JP)

(72) Inventors: Shuken Matsuura, Wako (JP); Koji Okabe, Wako (JP); Tomoaki Hosobe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/895,616

(22) PCT Filed: Apr. 1, 2014

(86) PCT No.: PCT/JP2014/059617
§ 371 (c)(1),
(2) Date: Dec. 3, 2015

(87) PCT Pub. No.: WO2014/196257
PCT Pub. Date: Dec. 11, 2014

(65) Prior Publication Data
US 2016/0101764 A1     Apr. 14, 2016

(30) Foreign Application Priority Data

Jun. 4, 2013  (JP) ................................ 2013-118173
Jun. 4, 2013  (JP) ................................ 2013-118212

(51) Int. Cl.
*B60S 1/58*   (2006.01)
*B60J 5/10*   (2006.01)
*B60S 1/04*   (2006.01)

(52) U.S. Cl.
CPC ............... *B60S 1/583* (2013.01); *B60J 5/102* (2013.01); *B60J 5/105* (2013.01); *B60J 5/107* (2013.01); *B60S 1/0466* (2013.01)

(58) Field of Classification Search
CPC ......... B60S 1/583; B60S 1/0466; B60J 5/102; B60J 5/105; B60J 5/107
See application file for complete search history.

(56) References Cited

U.S. PATENT DOCUMENTS

2003/0145411 A1    8/2003  Zuccaro et al.

FOREIGN PATENT DOCUMENTS

DE    10 2005 056 975       5/2007
EP        1764247 A2 *      3/2007 .............. B60J 5/104
(Continued)

OTHER PUBLICATIONS

International Search Report, dated Jul. 8, 2014 (Jul. 8, 2014).
European Search Report dated Nov. 30, 2016, 7 pages.

*Primary Examiner* — Glenn Dayoan
*Assistant Examiner* — Melissa A Black
(74) *Attorney, Agent, or Firm* — Rankin, Hill & Clark LLP

(57) ABSTRACT

This vehicle is provided with: a window opening and a secondary window opening, which are formed adjacent to each other in a vehicle body; a window panel for covering the window opening; a secondary window panel for covering the secondary window opening; and a wiper device for wiping both the window panel and the secondary window panel. The wiper device is provided with a wiper blade that is capable of passing over a boundary between the window panel and the secondary window panel to continuously wipe from the window panel to the secondary window panel.

13 Claims, 16 Drawing Sheets

(56) References Cited

FOREIGN PATENT DOCUMENTS

| | | |
|---|---|---|
| EP | 2 386 435 A1 | 11/2011 |
| FR | 2 720 991 | 12/1995 |
| FR | 2720991 A1 * | 12/1995 ............ B60J 5/105 |
| JP | 60-146745 | 8/1985 |
| JP | S62-52555 | 4/1987 |
| JP | 62-113614 | 5/1987 |
| JP | H02-23215 | 2/1990 |
| JP | H05-12025 | 9/1994 |
| JP | 2514650 | 8/1996 |
| JP | 2006-015902 | 1/2006 |

* cited by examiner

FIG.3
(a)
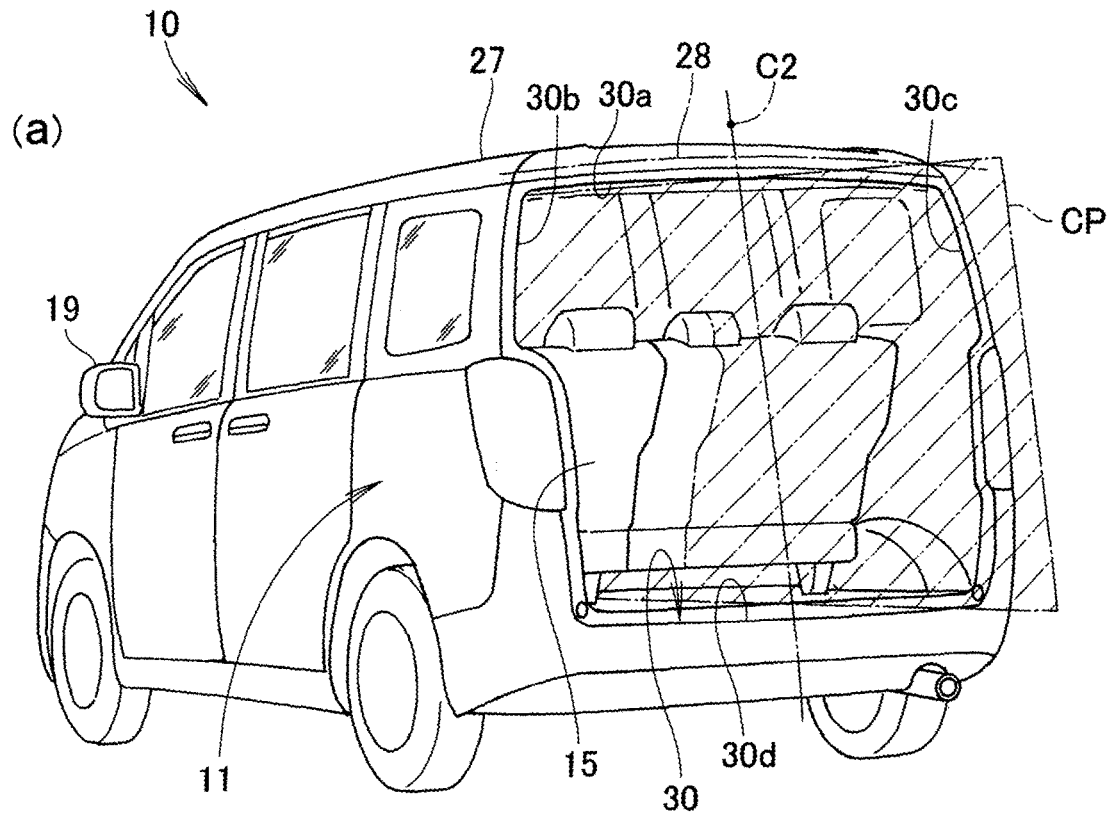
(b) (c)
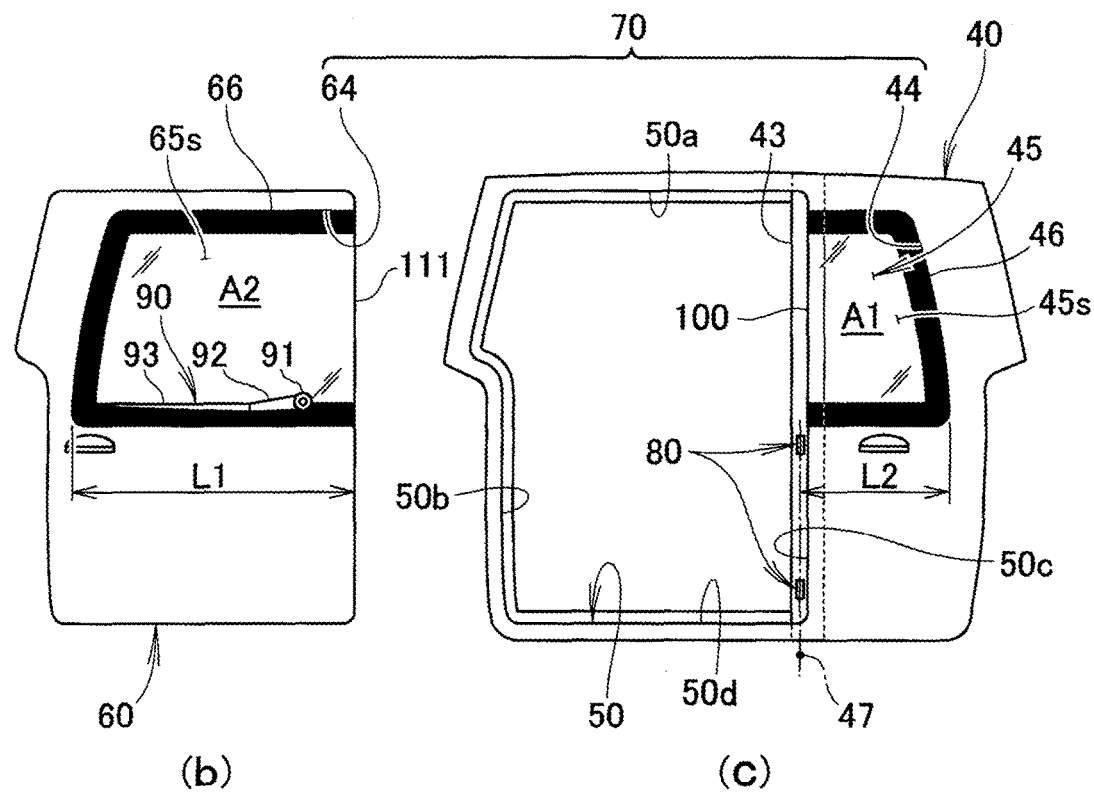

FIG.14
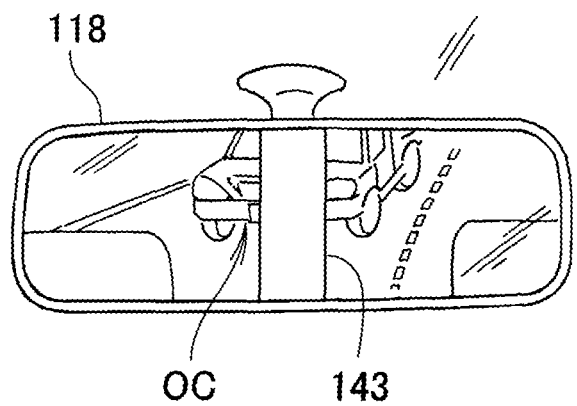
(a)
COMPARATIVE EXAMPLE
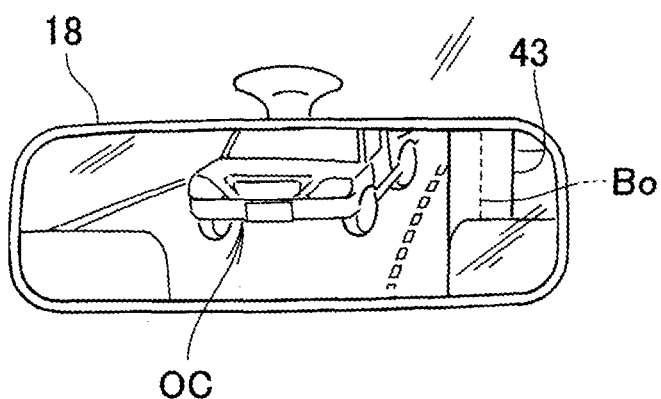
(b)
EMBODIMENT

FIG.15
(a)
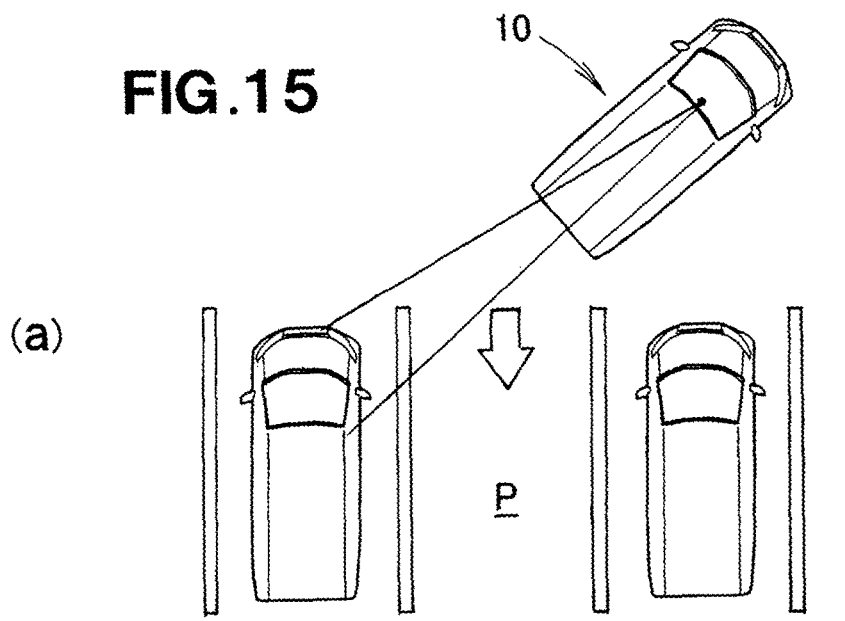
(b)
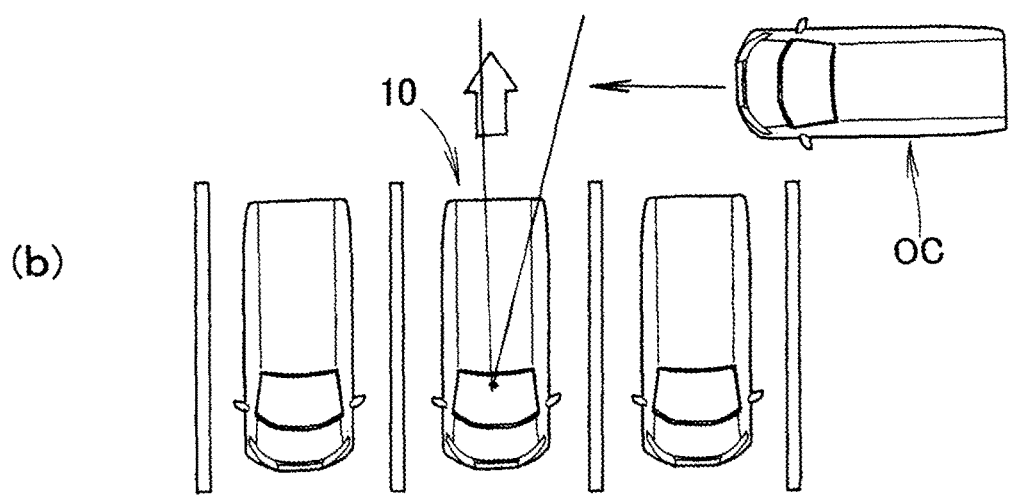
(c)
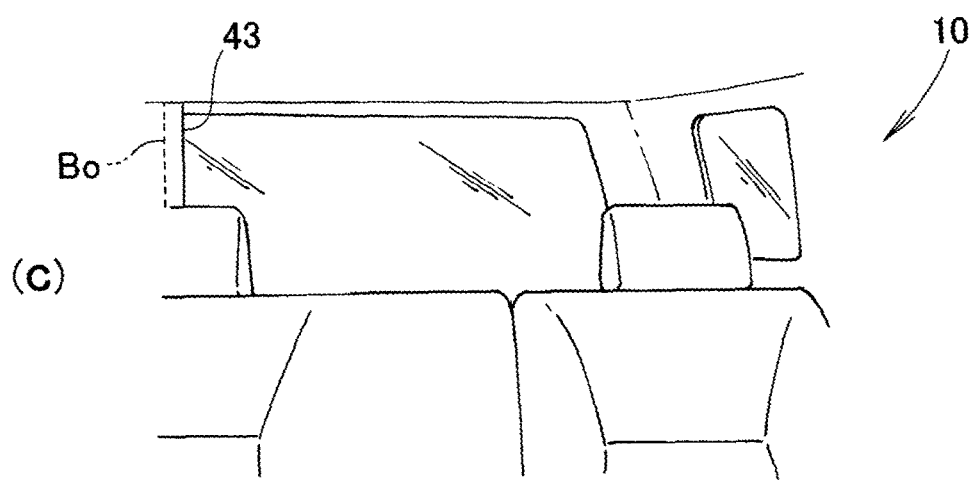

FIG.16
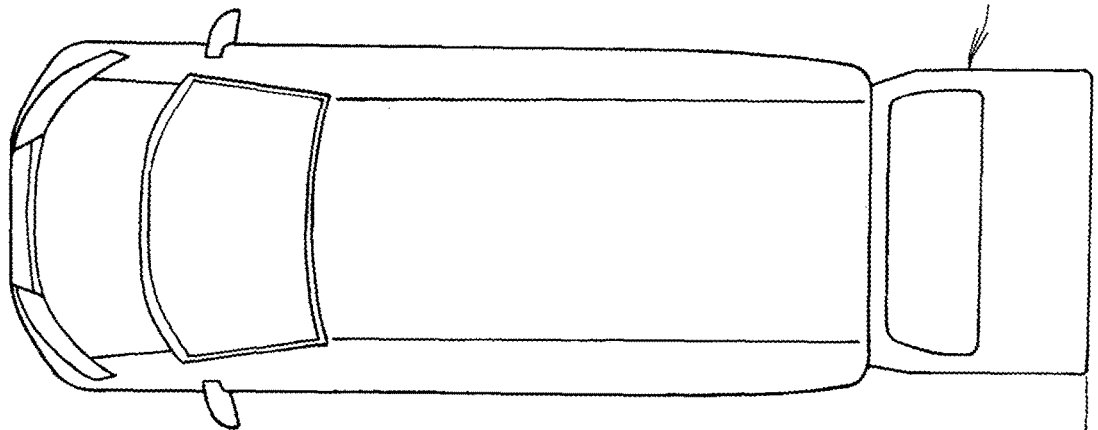
(a)
COMPARATIVE EXAMPLE
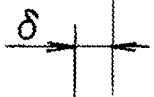
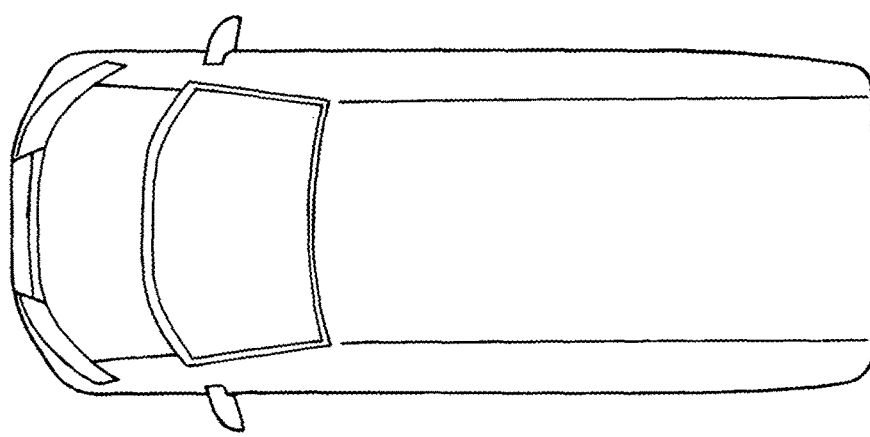
(b)
EMBODIMENT

VEHICLE

TECHNICAL FIELD

The present invention relates to a vehicle having a wiper device.

BACKGROUND ART

Patent Literature 1 discloses a conventional vehicle having a wiper device.

A wiper device for wiping a rear window panel is attached to the tailgate of the vehicle indicated in Patent Literature 1. The wiper device includes a pivot shaft attached to the tailgate, and a wiper blade for wiping the obverse surface of the rear window panel, the wiper blade being attached to the pivot shaft.

In the vehicle indicated in Patent Literature 2, a tailgate is attached to the rear part of a vehicle body. A double door is attached to the tailgate. The tailgate swings upward and downward, and the double door swings leftward and rightward.

It is possible to attach a window panel to the door of the vehicle indicated in Patent Literature 2, and apply the wiper device indicated in Patent Literature 1 in order to wipe the window panel. At such time, in the event that a wiper device is attached to each of the doors in order to wipe each of the window panels, the component cost is raised. However, when only one wiper device is used, only one of the window panels can be wiped, leaving scope for improvement in terms of obtaining an excellent field of view.

PRIOR ART LITERATURE

Patent Literature

Patent Literature 1: Japanese Patent Application Laid-Open Publication No. 2006-15902
Patent Literature 2: Japanese Utility Model Registration No. 2514650

SUMMARY OF INVENTION

Technical Problem

It is an object of the present invention to provide a technique whereby a good visibility even in a small number of components.

Solution to Problem

In the invention according to a first aspect, a vehicle is provided that includes a window opening and a secondary window opening that are formed in a vehicle body so as to be adjacent to each other, a window panel for covering the window opening, a secondary window panel for covering the secondary window opening, and a wiper device for wiping both the window panel and the secondary window panel, the wiper device having a wiper blade capable of crossing the boundary between the window panel and the secondary window panel and continuously wiping from the window panel to the secondary window panel.

In the invention according to a second aspect, it is preferable that: the length of the window opening in an adjoining direction is greater than the length of the secondary window opening in the adjoining direction, where the adjoining direction is defined as the direction extending from the window opening toward the secondary window opening; the wiper device further has a pivot shaft for a wiper blade; and the pivot shaft is positioned on the window opening side of the boundary.

In the invention according to a third aspect, it is preferable that: the window opening and the secondary window opening are formed on the rear surface of the vehicle body so as to be laterally adjoining; and the boundary deviates from the lateral-direction center toward one lateral-direction end.

In the invention according to a fourth aspect, it is preferable that the pivot shaft is provided at a location closer to the lateral-direction center than is the boundary.

In the invention according to a fifth aspect, it is preferable that the wiper blade is set to such a length as to span a visible portion of the secondary window panel, where the visible portion is defined as a portion of the secondary window panel where the vehicle interior is visible from the vehicle exterior.

In the invention according to a sixth aspect, it is preferable that: the window panel is provided so as to be movable relative to the secondary window panel; and, while the wiper device is stopped, the wiper blade is positioned on the window-panel side of the boundary.

In the invention according to a seventh aspect, it is preferable that the window panel is supported by a hinge so as to open toward the vehicle exterior, the hinge being provided along the boundary.

In the invention according to an eighth aspect, it is preferable that: the wiper blade reverses direction at two reversing positions, including a first reversing position and a second reversing position, and reciprocates between these two reversing positions; and, in the first reversing position, part of the wiper blade overlaps the boundary.

In the invention according to a ninth aspect, it is preferable that: the wiper blade reverses direction at two reversing positions, including a first reversing position and a second reversing position, and reciprocates between these two reversing positions; and, in the first reversing position, a pivot-shaft side end portion of the wiper blade overlaps the boundary.

In the invention according to a tenth aspect, it is preferable that: an edge of the window panel includes a window panel leading-end portion positioned closer to the obverse surface of the window panel than is the thickness-direction center of the window panel such that the window panel leading-end portion is closest to the secondary window panel, a first chamfered portion extending from the window panel leading-end portion to the obverse surface of the window panel, and a second chamfered portion extending from the window panel leading-end portion to the reverse surface of the window panel; and the length of the second chamfered portion is greater than the length of the first chamfered portion with respect to the direction along the obverse surface of the window panel.

In the invention according to an eleventh aspect, it is preferable that: an edge of the secondary window panel has a secondary window panel leading-end portion positioned closer to the obverse surface of the secondary window panel than is the thickness-direction center of the secondary window panel such that the secondary window panel leading-end portion is closest to the window panel, a third chamfered portion extending from the secondary window panel leading-end portion to the obverse surface of the secondary window panel, and a fourth chamfered portion extending from the secondary window panel leading-end portion to the reverse surface of the secondary window panel; and the length of the fourth chamfered portion is greater than the length of the third chamfered portion with respect to the direction along the obverse surface of the secondary window panel.

In the invention according to a twelfth aspect, it is preferable that: an edge of the secondary window panel has a secondary window panel leading-end portion positioned closer to the reverse surface of the secondary window panel than is the thickness-direction center of the secondary window panel such that the secondary window panel leading-end portion is closest to the window panel, a third chamfered portion extending from the secondary window panel leading-end portion to the obverse surface of the secondary window panel, and a fourth chamfered portion extending from the secondary window panel leading-end portion to the reverse surface of the secondary window panel; and the length of the fourth chamfered portion is less than the length of the third chamfered portion with respect to the direction along the obverse surface of the secondary window panel.

In the invention according to a thirteenth aspect, it is preferable that: a seal member is provided from the reverse surface of the secondary window panel across to the reverse surface of the window panel; the seal member includes an attachment base part attached to the reverse surface of the secondary window panel, and a seal lip extending integrally from the attachment base part toward the window panel; and the leading end of the seal lip is arranged closer to the secondary window panel than is an end of an attached member attached to the reverse surface of the window panel.

In the invention according to a fourteenth aspect, it is preferable that the window panel is provided to the vehicle body so as to be displaceable relative to the thickness direction of the secondary window panel.

In the invention according to a fifteenth aspect, it is preferable that: a first door opening is formed in the vehicle body, a first door for opening and closing the first door opening being attached to the vehicle body; a second door opening is formed in the first door, a second door for opening and closing the second door opening being attached to the first door; the window panel is attached to the second door; and the secondary window opening is formed in the first door.

Advantageous Effects of Invention

In the invention according to the first aspect, the wiper device has a wiper blade capable of crossing the boundary between the window panel and the secondary window panel and continuously wiping from the window panel to the secondary window panel. The wiper blade is actuated across the boundary between the window panel and the secondary window panel. Because the wiper blade is actuated across the boundary, it is possible to wipe the obverse surfaces of the window panel and the secondary window panel using a single wiper device. Using a single wiper device makes it possible to minimize the component cost. Furthermore, a smaller number of components makes it possible to obtain an excellent field of view.

The secondary window panel is configured so as to cover the secondary window opening adjacent to the window opening. It is possible to wipe the obverse surfaces of the window panel and the secondary window panel using a single wiper blade. This makes it possible to reduce the number of components and lower the component cost to a greater extent than when wiper blades are used for each of the window panel and the secondary window panel.

Additionally, it is possible to bring the window panel and the secondary window panel close together without using a molding or packing member. Therefore, it is possible to improve the external appearance and ensure a wide field of view.

In the invention according to the second aspect, the pivot shaft is positioned on the window opening side of the boundary, and the length of the window opening in the adjoining direction is greater than the length of the secondary window opening in the adjoining direction. For the sake of argument, the length in a direction perpendicular to the adjoining direction is fixed. In this case, the area of the window opening would be greater than the area of the secondary window opening. When the window opening is larger than the secondary window opening, the window panel is larger than the secondary window panel. The pivot shaft is positioned toward the window opening having a greater area. This makes it possible to increase the wiped area of the window panel so as to be greater than the wiped area of the secondary window panel. It is possible to ensure the size of the wiped area obtained by combining the sizes of each of the window panels. Specifically, the wiped area can be maximized.

In the invention according to the third aspect, the boundary deviates from the lateral-direction center of the vehicle rear surface toward one lateral-direction end. In a typical vehicle, a rear-view mirror is attached in the lateral center of the front part of the passenger compartment. The center of the rear-view mirror offers a clear line-of-sight to a vehicle occupant, and has an appreciable effect on visibility. The deviation of the boundary makes it possible to prevent the boundary from being reflected in the center of the rear-view mirror. This makes it possible to achieve an excellent field of view via the rear-view mirror.

In the invention according to the fourth aspect, the pivot shaft is provided at a location closer to the lateral-direction center line than is the boundary. Specifically, the pivot shaft is provided between the boundary and the lateral-direction center line. Thus, by providing the pivot shaft at a location close to the lateral-direction center line, it is possible to ensure that the area wiped by the wiper blade is wide.

In the invention according to the fifth aspect, the wiper blade is set to such a length as to span a visible portion of the secondary window panel. This makes it possible to ensure a sufficient wiped area even on the obverse surface of the secondary window panel, which has a smaller wiped area than does the obverse surface of the window panel.

In the invention according to the sixth aspect, the window panel is provided so as to be movable relative to the secondary window panel. Additionally, while the wiper device is stopped, the wiper blade is positioned on the window panel side of the boundary. Specifically, while the wiper device is stopped, the pivot shaft and the wiper blade are both arranged on the window-panel side. For the sake of argument, the pivot shaft is positioned on the window-panel side and the wiper blade is positioned on the secondary-window-panel side. In this case, the wiper blade could obstruct the movement of the window panel when the window panel is to be caused to move. In order to prevent such a circumstance, the pivot shaft and wiper blade are both arranged on the window-panel side as the same member. Therefore, it is possible to ensure the smooth movement of the window panel.

In the invention according to the seventh aspect, the window panel is supported by a hinge so as to open toward the vehicle exterior, the hinge being provided along the boundary. Providing the hinge along the boundary makes it possible to prevent the secondary window panel from interfering when the window panel has been made to swing.

Additionally, setting the wiper blade so as not to span the boundary prevents the wiper blade from interfering with the swinging of the window panel, even when the window panel is close to the secondary window panel.

In the invention according to the eighth aspect, part of the wiper blade overlaps the boundary in the first reversing position where the wiper blade reverses direction. Typically, blade rubber is attached to the leading end of the wiper blade. In a position where the first reversing position and the boundary overlap, the leading end of the blade rubber is not in contact with the obverse surfaces of the window panel and the secondary window panel. In the first reversing position where the movement direction of the wiper blade is reversed, it is necessary for the leading end of the blade rubber to reverse direction as well. By having the leading end of the blade rubber not be in contact with the obverse surfaces of the window panel and the secondary window panel, it is possible to easily reverse the direction of the leading end of the blade rubber.

In the invention according to the ninth aspect, the end portion of the wiper blade on the pivot-shaft side overlaps the boundary in the first reversing position where the wiper blade reverses direction. Typically, blade rubber is attached to the leading end of the wiper blade. When the wiper blade intersects the boundary, the blade rubber could wear down faster than other locations. However, wear on the blade rubber is minimized by having the end portion of the wiper blade on the pivot-shaft side, which moves the least during the swinging motion, overlap the boundary. This makes it possible to minimize any decrease in visibility caused by a decline in the wiping characteristics due to wear.

In the invention according to the tenth aspect, the window panel leading-end portion is positioned closer to the obverse surface of the window panel than is the thickness center of the window panel. Additionally, the length of the second chamfered portion extending from the window panel leading-end portion to the reverse surface of the window panel is greater than the length of the first chamfered portion extending from the window panel leading-end portion to the obverse surface of the window panel. The portion from the obverse surface part to the reverse surface part is formed by the two chamfered portions, whereby it is possible to minimize wear on the blade rubber. Furthermore, the window panel leading-end portion is positioned closer to the obverse surface of the window panel than is the thickness center of the window panel, and the length of the first chamfered portion is less than the length of the second chamfered portion; therefore, the length of the blade rubber that comes into contact with the edge of the window panel is low. This makes it possible to further minimize wear on the blade rubber. Specifically, it is possible to extend the service life of the blade rubber of the wiper device having the wiper blade that moves to an outer portion of the window panel.

In the invention according to the eleventh aspect, the secondary window panel leading-end portion is positioned closer to the obverse surface of the secondary window panel than is the thickness center of the secondary window panel. Additionally, the length of the fourth chamfered portion extending from the secondary window panel leading-end portion to the reverse surface of the secondary window panel is greater than the length of the third chamfered portion extending from the secondary window panel leading-end portion to the obverse surface of the secondary window panel. The portion from the obverse surface part to the reverse surface part is formed by the two chamfered portions, whereby it is possible to minimize wear on the blade rubber. Furthermore, the secondary window panel leading-end portion is positioned closer to the obverse surface of the secondary window panel than is the thickness center of the secondary window panel, and the length of the third chamfered portion is less than the length of the fourth chamfered portion; therefore, the length of the blade rubber that comes into contact with the edge of the secondary window panel is low. This makes it possible to further minimize wear on the blade rubber.

In the invention according to the twelfth aspect, the secondary window panel leading-end portion is positioned closer to the reverse surface of the secondary window panel than is the thickness center of the secondary window panel. Additionally, the length of the fourth chamfered portion extending from the secondary window panel leading-end portion to the reverse surface of the secondary window panel is less than the length of the third chamfered portion extending from the secondary window panel leading-end portion to the obverse surface of the secondary window panel. The portion from the obverse surface part to the reverse surface part is formed by the two chamfered portions, whereby it is possible to minimize wear on the blade rubber. Furthermore, it is possible to cause the window panel leading-end portion and the secondary window panel leading-end portion to overlap in a direction orthogonal to the window panel. This makes it possible to achieve a labyrinth structure, and to suppress the infiltration of water from the vehicle exterior.

In the invention according to the thirteenth aspect, a seal member is provided from the reverse surface of the secondary window panel across to the reverse surface of the window panel. This makes it possible to obstruct the gap between the window panel and the secondary window panel. It is possible to more reliably suppress the infiltration of water from the vehicle exterior.

Additionally, the seal lip is extended toward the long second chamfered portion. This makes it possible to, e.g., arrange the seal lip and an outer panel in an aligned manner, and to ensure the length of the seal lip while reducing the thickness of the window panel.

In the invention according to the fourteenth aspect, the window panel is provided to the vehicle body so as to be displaceable relative to the thickness direction of the secondary window panel. The window panel leading-end portion is positioned closer to the obverse surface of the window panel, and the secondary window panel leading-end portion is positioned closer to the reverse surface of the secondary window panel. Interference by the secondary window panel leading-end portion during displacement of the window panel is prevented by having the window panel be displaced toward the vehicle exterior. Therefore, it is unnecessary to displace the secondary window panel when displacing the window panel. This facilitates the operation for displacing the window panel.

In the invention according to the fifteenth aspect, the window panel is attached to the second door, and the secondary window opening is formed in the first door. When the first door is opened, it is possible to ensure a large space, and to easily bring large objects in and out. Additionally, the secondary window panel leading-end portion does not interfere when opening the second door; therefore, it is possible to easily open and close the doors.

BRIEF DESCRIPTION OF DRAWINGS

FIG. 3 is an exploded perspective view of the vehicle illustrated in FIG. 1;

FIG. 14 is a view of the operation of the rear-view mirror during travel of the vehicle illustrated in FIG. 1;

FIG. 15 is a view of the operation during parking of the vehicle illustrated in FIG. 1;

FIG. 16 is a view of the door in FIG. 1 in further detail; and

DESCRIPTION OF EMBODIMENTS

Figure 1:
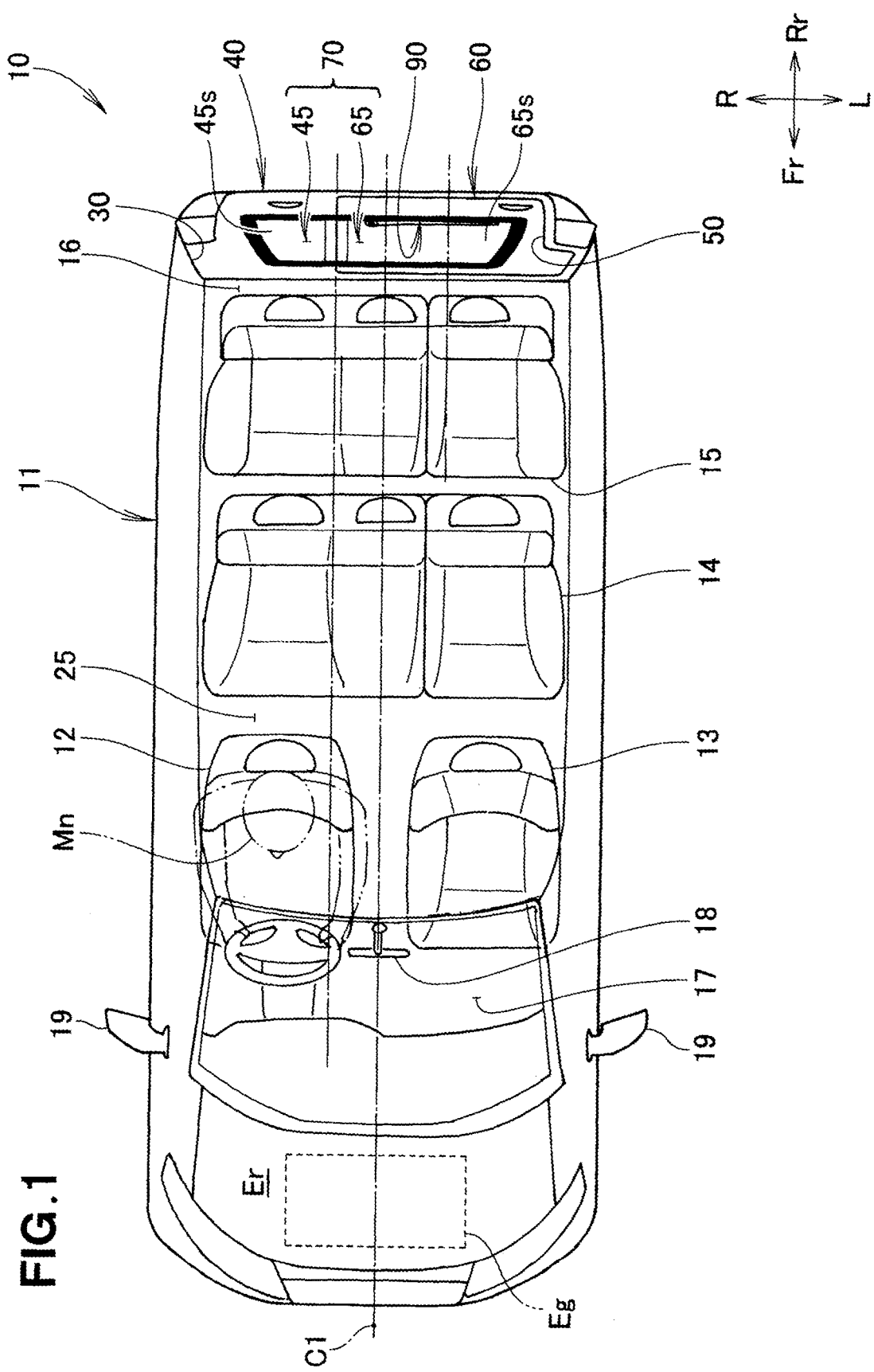
FIG. 1 is a perspective drawing of a vehicle according to the embodiments of the present invention.

Embodiments of the present invention are described below with reference to the accompanying drawings. In the description, "left" and "right" are based on the perspective of a vehicle occupant in the vehicle, and "front" and "rear" are based on the direction of travel of the vehicle. In the drawings, "Fr" indicates the frontward direction, "Rr" indicates the rearward direction, "L" indicates the leftward direction as viewed by a vehicle occupant, "R" indicates the rightward direction as viewed by the vehicle occupant, "Up" indicates the upward direction, and "Dw" indicates the downward direction.

First Embodiment

The vehicle 10 illustrated in FIG. 1 is an example of a right-hand-drive van. A passenger compartment 25 of the vehicle 10 is provided with three rows of seats in the longitudinal direction of a vehicle body 11. An engine Eg is mounted in an engine compartment Er forward of the passenger compartment 25.

A driver's seat 12 and a passenger seat 13 are provided as a first row of seats in the passenger compartment 25. The driver's seat 12 and the passenger seat 13 are disposed so that a center line C1 extending in a front-rear direction at the center in a lateral direction is interposed therebetween. Specifically, the driver's seat 12 and the passenger seat 13 are offset from the center line C1. In a right-hand-drive vehicle, the driver's seat 12 is provided on the right of the center line C1, and the passenger seat 13 is provided on the left of the center line C1.

A second-row seat 14 and a third-row seat 15 individually extending in the lateral direction and capable of seating three people are provided in a second row and a third row, respectively. A cargo compartment 16 for carrying cargo is formed in a rear part of the third-row seat 15. A tailgate 40 for loading and unloading cargo for the cargo compartment 16 is attached so as to be capable of swinging. The cargo compartment 16 constitutes a portion of the passenger compartment 25.

A rear-view mirror 18 for rearward checking by a vehicle occupant Mn is attached to a windshield 17. Side mirrors 19, 19 for lateral and rearward checking by the vehicle occupant are attached to left and right end parts of a front part of the vehicle body 11.

Figure 2:
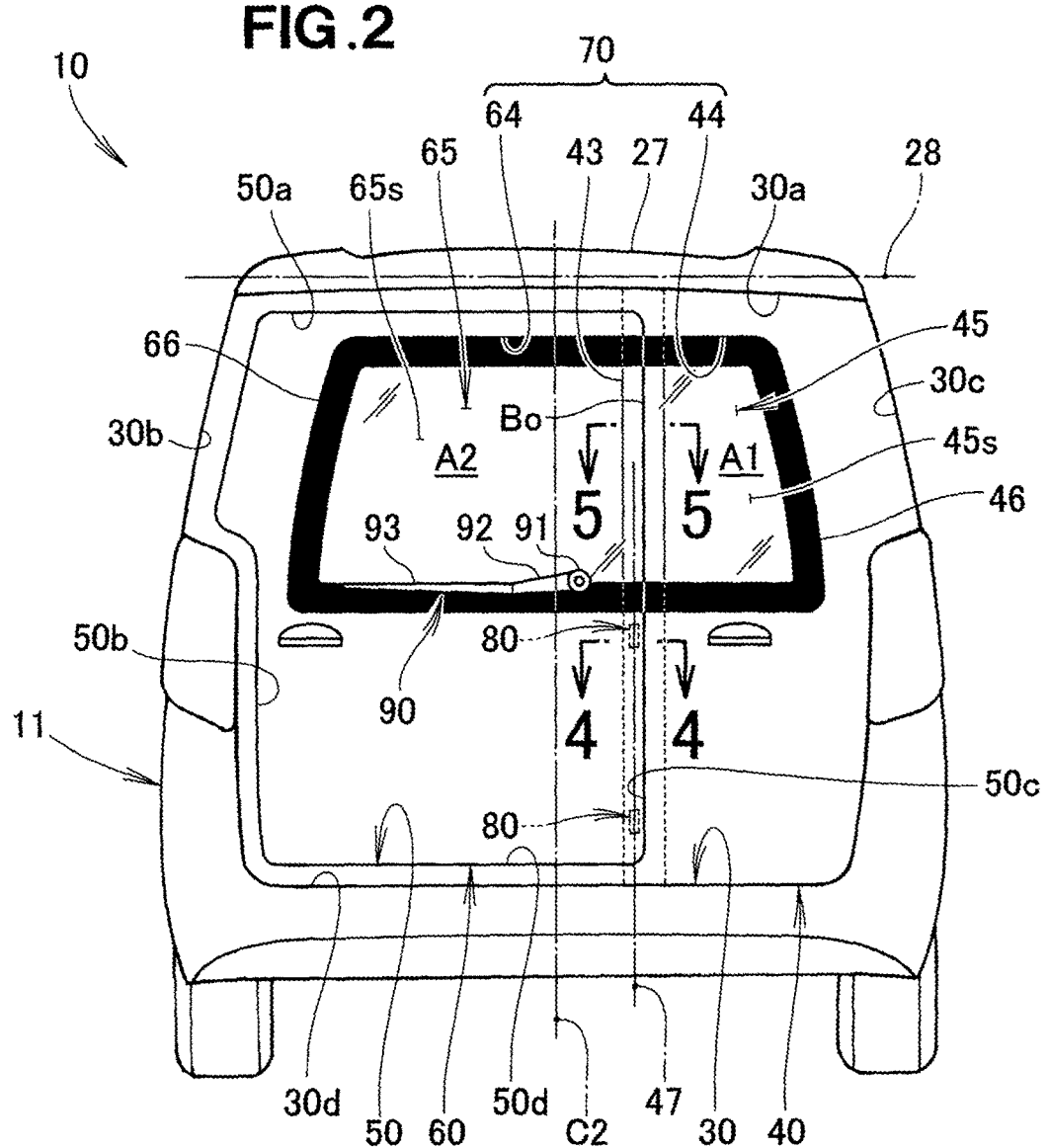
FIG. 2 is a rear view of the vehicle illustrated in FIG. 1.

As illustrated in FIGS. 2 through 3, a rear opening 30 (first door opening 30) is formed across the entire rear face of the vehicle 10 in the lateral direction and a top-bottom direction thereof. The tailgate 40 (first door 40) is attached so as to be capable of opening and closing the rear opening 30. The tailgate 40 constitutes the rear face of the vehicle when closed. A passenger opening 50 (second door opening 50) is formed across the entire height of the tailgate 40. The passenger opening 50 is an opening formed for a vehicle occupant to enter and exit, and is formed in a portion of the tailgate 40 in the lateral direction. A door 60 (second door 60) is attached to the passenger opening 50 so as to be able to open and close.

The rear-part opening 30 formed in the rear surface of the vehicle 10 is substantially rectangular, and is formed from an upper edge 30a formed close to the roof 27 of the vehicle body 11 along the lateral direction, left and right side edges 30b, 30c (b indicates the side edge on the right side; c indicates the side edge on the left side) extending downward from the two ends of the upper edge 30a along the lateral-direction end part of the vehicle body, and a lower edge 30d connecting the lower ends of the left and right side edges 30b, 30c.

A pillar 43 is formed in the top-bottom direction in the vicinity of the passenger opening 50 provided in the tailgate 40. The pillar 43 is formed integrally with the tailgate 40. Formation of the pillar 43 in the tailgate 40 makes it possible to increase the rigidity of the vehicle 10 against external forces received from behind the vehicle 10.

A secondary window opening 44 as an opening for checking outside the vehicle from the passenger compartment is formed in a top part of the tailgate 40. The secondary window opening 44 is covered by a glass secondary window panel 45 (adjacent panel 45). The secondary window panel 45 covers the vehicle-outer side of the pillar 43 in addition to covering the secondary window opening 44.

The passenger opening 50 is substantially rectangular, and is formed from a top edge 50a formed along the top edge 30a of the rear opening 30, a side edge 50b extending from one end of the top edge 50a downward along the pillar 43, a side edge 50c extending from the other end of the top edge 50a downward along the side edge 30c of the rear opening 30, and a bottom edge 50d connecting bottom ends of the side edges 50b, 50c.

The center line C2 extending in the top-bottom direction at the lateral center is interposed between the side edges 50b, 50c of the passenger opening 50. Specifically, the left and right side edges 50b, 50c of the passenger opening 50 are offset in locations away from the lateral center. The width in the lateral direction of the passenger opening 50 formed in the tailgate 40 is less than the width of the rear opening 30, as shall be apparent. The center line C2 extending in the top-bottom direction is orthogonal to the first opening/closing axis 28.

A substantially U-shaped ceramic layer 46 is formed on the end portion of the obverse surface 45s of the secondary window panel 45. The ceramic layer 46 is formed by baking a black ceramic paste. An adhesive layer for causing the secondary window panel 45 to adhere to the vehicle body 11 is covered by the ceramic layer 46. Specifically, the ceramic layer 46 fulfills the role of a concealing screen.

A portion of the obverse surface 45s of the secondary window panel 45 that is further inward than is the ceramic layer 46 is a visible portion A1 where the vehicle interior is visible from the vehicle exterior. Should no ceramic layer 46 be formed on the secondary window panel 45, the visible portion is the portion of the secondary window panel 45 that overlaps the inner edge of the secondary window opening 44 with respect to the longitudinal direction.

The door 60 is supported by the pillar 43 via two hinges 80, and has a "sideways-opening" configuration. An axis extending in the vertical direction through the center of the two hinges 80 is referred to as a second opening/closing axis 47, and the door 60 swings about the second opening/closing axis 47.

A window opening 64 is formed in the upper part of the vehicle door 60 so as to be continuous with the secondary window opening 44, the window opening 64 being used to check the vehicle exterior from the passenger compartment. The window opening 64 is covered by a glass window panel 65. The window panel 65 is provided adjacent to the secondary window panel 45.

As shown in FIG. 2 in particular, the second opening/closing axis runs along the boundary Bo between the window panel 65 and the secondary window panel 45. The door 60 swings horizontally and in the front-rear direction of the vehicle body 11. Specifically, the window panel 65 is provided so as to be movable relative to the thickness direction of the secondary window panel 45.

A wiper device 90 for wiping the obverse surfaces 65s, 45s of the window panel 65 and the secondary window panel 45 is provided to the vehicle door 60. The wiper device 90 includes a pivot shaft 91 attached to the vehicle door 60, a wiper arm 92 extending from the pivot shaft 91 along the obverse surface 65s of the window panel 65, and a wiper blade 93 attached to the distal end of the wiper arm 92.

The pivot shaft 91 is attached to the vehicle door 60, and is positioned on the window opening 64 side of the boundary Bo. The wiper device 90 shall be described in detail below.

The secondary window opening 44 is of the same height as the window opening 64 (the same length in the vertical direction), and is positioned at the same position in the height direction. The secondary window opening 44 and the window opening 64 are thereby integrally connected in the lateral direction.

As shown in FIG. 3 in particular, the length L1 of the window opening 64 in the lateral direction is greater than the length L2 of the secondary window opening 44 in the lateral direction, the lateral direction being used as a reference. Specifically, the length L1 of the window opening 64 in an adjoining direction is greater than the length L2 of the secondary window opening 44 in the adjoining direction, where the adjoining direction is defined as the direction extending from the window opening 64 toward the secondary window opening 44.

As seen in FIG. 2, the boundary Bo between the window opening 64 and the secondary window opening 44 is offset toward the driver seat with respect to a center axis C2 extending vertically in the lateral center. The boundary Bo overlaps the pillar 43.

The secondary window opening 44 and the window opening 64 are collectively referred to as a "window part 70" as appropriate. The window part 70 is formed across the entire lateral direction. Due to this configuration, the window part 70 naturally is formed in at least a lateral center position. A pillar 43 is continuously formed from top to bottom between the secondary window opening 44 and the side edge 50b of the passenger opening 50 positioned in the vicinity of the secondary window opening 44.

The passenger opening 50 is formed across substantially the entire range of more than half of the tailgate 40. Reserving half or more of the width of the rear opening 30 for the passenger opening 50 makes it possible to ensure adequate space for loading and unloading cargo or entering and exiting of people. The amount that the door 60 protrudes is reduced, and interference of objects around the vehicle 10 with the door 60 is thereby suppressed.

The window part 70 is formed in a position overlapping with a center plane CP, where the center plane CP is a plane extending in the front-rear direction of the vehicle body through the center line C2 extending up and down through the lateral center of the tailgate 40, as illustrated in FIG. 3.

As illustrated in FIGS. 1 and 2, the side edge 50c of the passenger opening 50 extending along a lateral end part is positioned on the opposite side from the driver's seat 12 with respect to the center line C1 extending in the front-rear direction of the vehicle body and the lateral center C2 extending in the top-bottom direction of the vehicle body. Meanwhile, the side edge 50b of the passenger opening 50 on the lateral-center side is positioned on the driver's seat 12 side of the center line C1 extending in the front-rear direction of the vehicle body and the lateral center C2 extending in the top-bottom direction of the vehicle body.

The pillar 43 and the second opening/closing axis 47 are provided in a position overlapping with the driver's seat 12 as viewed from behind the vehicle body 11. The second opening/closing axis 47 extends beside the side edge 50c of the passenger opening 50. The side edge 50c of the passenger opening 50 can be referred to as a side edge on the driver's seat 12 side.

As shown in FIG. 2, a substantially U-shaped ceramic layer 66 is formed on the end portion of the obverse surface 65s of the window panel 65. The ceramic layer 66 is similar to the ceramic layer 46 formed on the secondary window panel 45; therefore, no detailed description thereof shall be given.

A portion of the obverse surface 65s of the window panel 65 that is further inward than is the ceramic layer 66 is a visible portion A2 where the vehicle interior is visible from the vehicle exterior. Should no ceramic layer 66 be formed on the window panel 65, the visible portion is the portion of the window panel 65 that overlaps the inner edge of the window opening 64 with respect to the longitudinal direction.

The ceramic layers 46, 66 are both formed substantially in a U-shape, and the openings of the U-shapes are arranged so as to face each other, such that the entire shape is substantially rectangular.

Besides glass, a resin panel or any other material that forms a transparent panel may be used for the secondary window panel 45 and the window panel 65.

Figure 4:
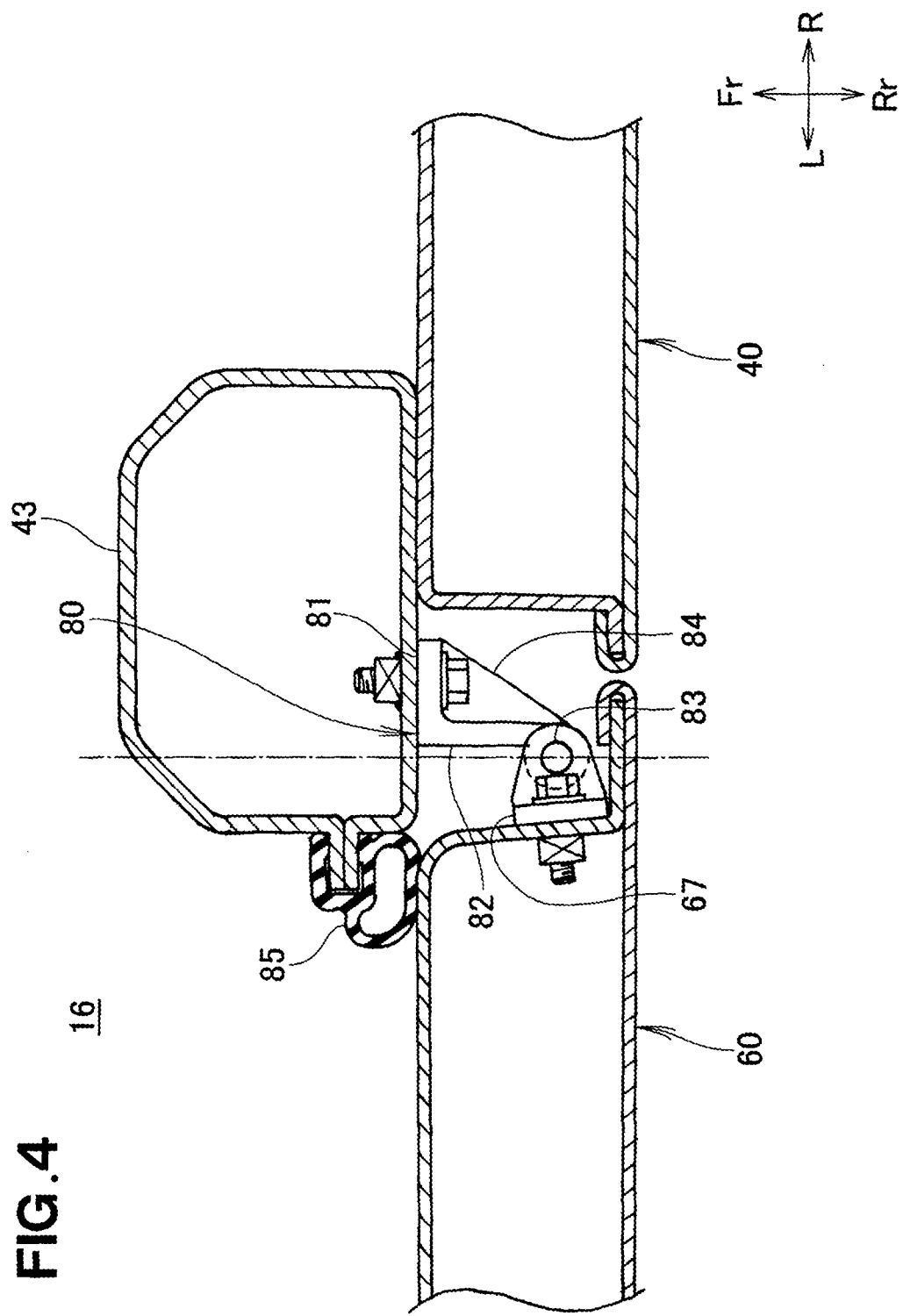
FIG. 4 is a cross-sectional view along lines 4-4 in FIG. 2.

The structure whereby the door 60 is attached will be described in detail using FIG. 4. As illustrated in FIG. 4, the door 60 is supported by the closed-section-shaped pillar 43 via the hinge 80. The hinge 80 and a seal member 85 for forming a seal between the door 60 and the inside of the passenger compartment are attached to the pillar 43.

The hinge 80 is substantially L-shaped, and is composed of a base part 81 attached to the pillar 43, an arm part 82 extending toward the rear of the vehicle body from the base part 81, a pin 83 for swingably supporting the door 60, the pin 83 being attached to the distal end of the arm part 82, and a reinforcing part 84 spanning between the base part 81 and the arm part 82 for reinforcement thereof. An attached member 67 is fastened to the door 60, and the pin 83 passes through the attached member 67.

The door 60 is attached in a portion of the tailgate 40 by the hinge 80. The vehicle door 60 is capable of swinging in the vehicle-longitudinal direction. The door 60 is swingably supported by the hinge 80, and it is therefore possible to simplify the structure for supporting the door 60.

The secondary window panel 45 and window panel 65 shown in FIGS. 5 and 6 shall be described in detail below.

Figure 5:
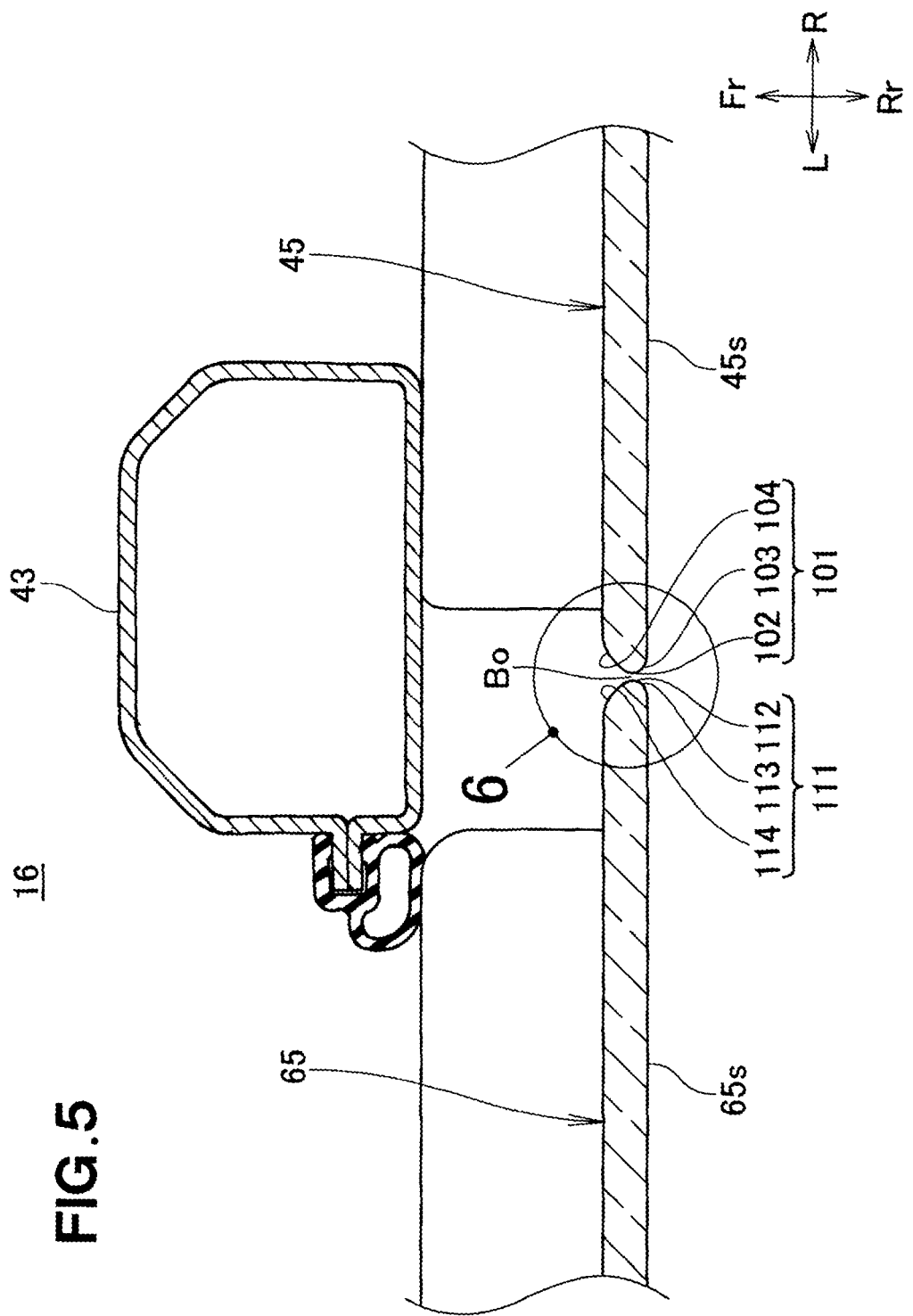
FIG. 5 is a cross-sectional view along lines 5-5 in FIG. 2.
Figure 6:
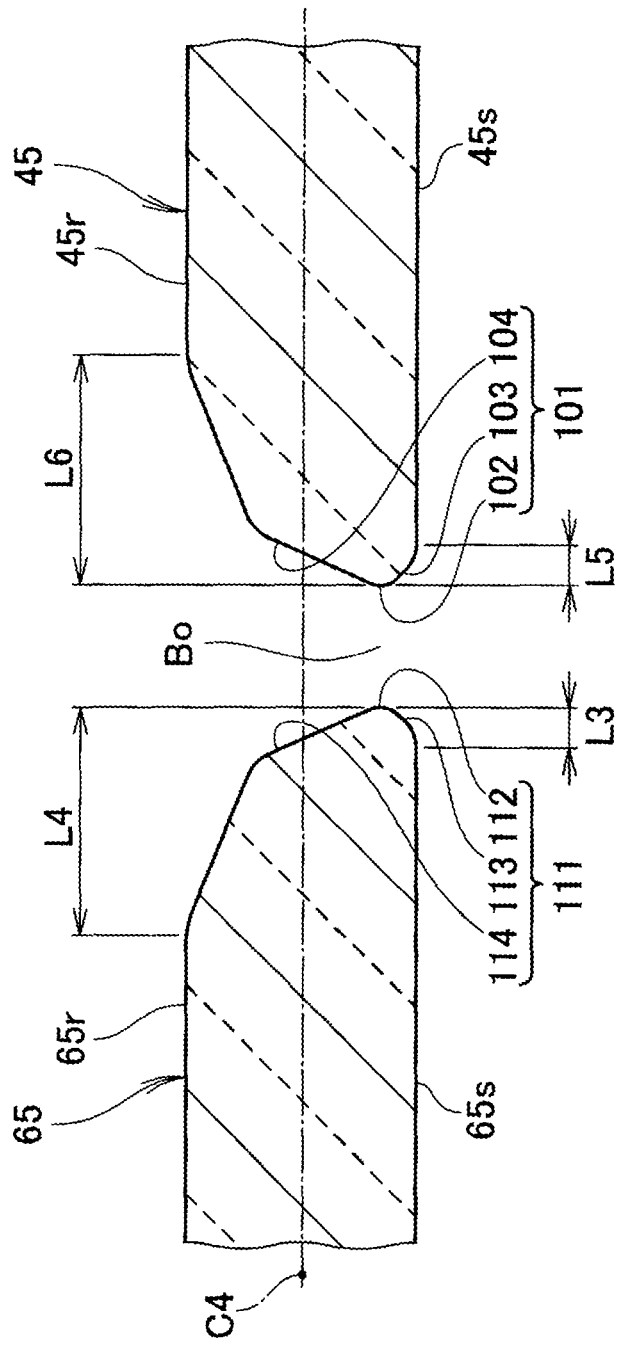
FIG. 6 is a partial enlarged view of FIG. 5.

As shown in FIGS. 5 and 6, the secondary window panel 45 is provided along the obverse surface 65s of the window panel 65. One edge 101, 111 of each of the window panels 45, 65 is arranged so as to directly face the other. Through this configuration in which the edge 101, 111 of the window panes 45, 65 directly face each other, the window panels 45, 65 appear integrated when viewed from behind the vehicle, and the design properties of the vehicle can be enhanced.

Furthermore, the obverse surface 45s of the secondary window panel 45 and the obverse surface 65s of the window panel 65 are arranged such that the entire obverse surface is connected. Specifically, the obverse surface 45s of the secondary window panel 45 and the obverse surface 65s of the window panel 65 are arranged flush with each other. This further enhances the design characteristics of the vehicle.

The edge 111 of the window panel 65 includes: a window panel leading-end portion 112 closest to the secondary window panel 45; a first chamfered portion 113 extending from the window panel leading-edge portion 112 to the obverse surface 65s of the window panel 65, the first chamfered portion 113 having a chamfered shape; and a second chamfered portion 114 extending from the window panel leading-end portion 112 to the reverse surface 65r of the window panel 65, the second chamfered portion 114 having a chamfered shape.

As shown in FIG. 5 in particular, the window panel leading-end portion 112 is positioned closer to the obverse surface 65s of the window panel 65 than is the thickness center C4 of the window panel 65. The length L4 of the second chamfered portion 114 is greater than the length L3 of the first chamfered portion 113, the direction along the obverse surface 65s of the window panel 65 being used as a reference. The reason for adopting such a configuration shall be described below.

The edge 101 of the secondary window panel 45 is of similar shape. Specifically, the edge 101 of the secondary window panel 45 includes: a secondary window panel leading-end portion 102 closest to the window panel 65; a third chamfered portion 103 extending from the secondary window panel leading-end portion 102 to the obverse surface 45s of the secondary window panel 45, the third chamfered portion 103 having a chamfered shape; and a fourth chamfered portion 104 extending from the secondary window panel leading-end portion 102 to the reverse surface 45r of the secondary window panel 45, the fourth chamfered portion 104 having a chamfered shape. The secondary window panel leading-end portion 102 is positioned closer to the obverse surface 45s of the secondary window panel 45 than is the thickness center C4 of the secondary window panel 65.

The length L6 of the fourth chamfered portion 104 is greater than the length L5 of the third chamfered portion 103 with respect to the direction along the obverse surface 45s of the secondary window panel 45.

The wiper device 90 of FIG. 7 shall be described in detail below.

Figure 7:
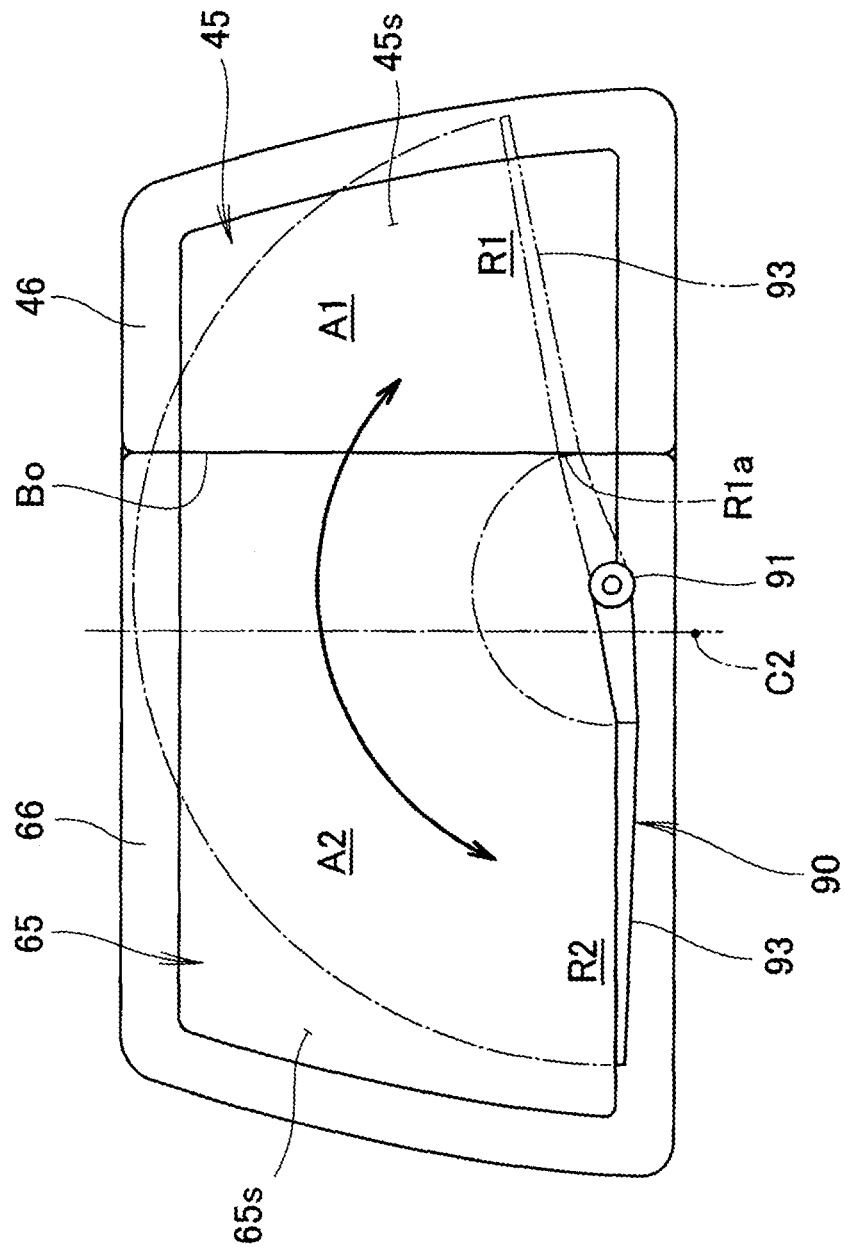
FIG. 7 is a view of an action of a wiper device shown in FIG. 2.

As shown in FIG. 7, the wiper device 90 is configured so as to be capable of wiping the obverse surfaces 65s, 45s of the window panel 65 and the secondary window panel 45.

The pivot shaft 91 is positioned between the boundary Bo and the central axis C2 extending vertically in the lateral center. Specifically, the pivot shaft 91 is provided at a location on the lateral-direction-center side of the boundary Bo.

The wiper blade 93 is capable of crossing the boundary Bo between the window panel 65 and the secondary window panel 45 and continuously wiping from the window panel 65 to the secondary window panel 45.

When the wiper device 90 is actuated, the wiper blade 93 wipes on the obverse surface 65s of the window panel 65 and on the obverse surface 45s of the secondary window panel 45 to the position indicated by phantom lines. The wiper blade 93 indicated by the phantom lines swings to the position of the wiper blade indicated by solid lines.

Specifically, the wiper blade 93 reverses direction at each of the positions of the wiper blade 93 indicated by solid lines and the wiper blade 93 indicated by phantom lines. The position of the wiper blade 93 indicated by phantom lines shall be referred to as a first reversing position R1. The position of the wiper blade 93 indicated by solid lines shall be referred to as a second reversing position R2. The wiper blade 93 reciprocates between the first reversing position R1 and the second reversing position R2.

The end part R1a of the pivot shaft 91 in the first reversing position R1 overlaps the boundary Bo. In the second reversing position R2, the end part R1a is positioned over the obverse surface 65s of the window panel 65. When the wiper device 90 is stopped, the wiper blade 93 stops in the second reversing position R2. Specifically, while the wiper device 90 is stopped, the wiper blade 93 is positioned on the window panel 65 side of the boundary Bo.

In the first reversing position R1, the distal end of the wiper blade 93 reaches the ceramic layer 46 on the secondary window-panel 45 side. Specifically, the wiper blade 93 is set to such a length as to span the visible portion A1 of the secondary window panel 45.

The wiper device 90 has a wiper blade 93 capable of crossing the boundary Bo between the window panel 65 and the secondary window panel 45 and continuously wiping from the window panel 65 to the secondary window panel 45. The wiper blade 93 is actuated across the boundary Bo between the window panel 65 and the secondary window panel 45. Because the wiper blade 93 is actuated across the boundary Bo, it is possible to wipe the obverse surfaces 65s, 45s of the window panel 65 and the secondary window panel 45 using a single wiper device 90. Using a single wiper device 90 makes it possible to minimize the component cost. Furthermore, a smaller number of components makes it possible to obtain an excellent field of view.

Additionally, it is possible to bring the window panel 65 and the secondary window panel 45 close together without using a molding or packing member. Therefore, it is possible to improve the external appearance and ensure a wide field of view.

The pivot shaft 91 is provided at a location on the lateral-direction-center-line C2 side of the boundary Bo. Specifically, the pivot shaft 91 is provided between the boundary Bo and the lateral-direction center line C2. The pivot shaft 91 is thus provided at a location close to the lateral-direction center line C2, thereby making it possible to ensure that the area wiped by the wiper blade 93 is wide.

The wiper blade 93 is set to such a length as to span the visible portion A1 of the secondary window panel 45. This makes it possible to ensure a sufficient wiped area on the obverse surface 45*s* of the secondary window panel 45, which has a smaller wiped area than does the obverse surface 65*s* of the window panel 65.

As shall be apparent from referring to FIG. 3, the pivot shaft 91 is positioned on the window opening 64 side of the boundary Bo, and the length L1 of the window opening 64 in the lateral direction is greater than the length L2 of the secondary window opening 44 in the lateral direction. Specifically, the pivot shaft 91 is positioned closer to the window opening 64 having a greater area. This makes it possible to increase the wiped area of the window panel 65 so as to be greater than the wiped area of the secondary window panel 45. It is possible to ensure the size of the wiped area obtained by combining the sizes of each of the window panels 65, 45. Specifically, the wiped area can be maximized.

Figure 8:
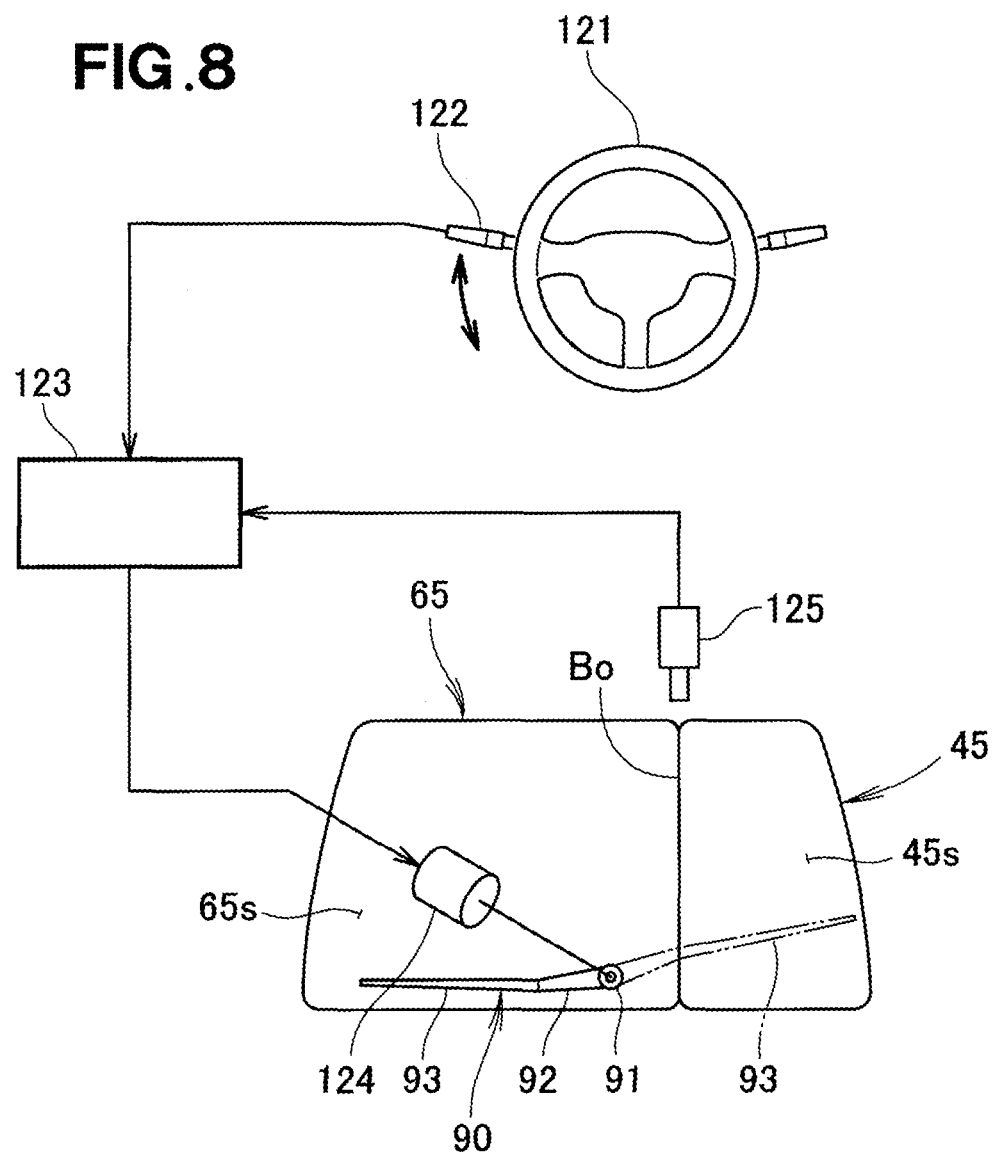
FIG. 8 is a schematic view of a wiper device shown in FIG. 7.

As shown in FIG. 8, a wiper switch 122 for operating the wiper device 90 is swingably attached in the vicinity of the steering wheel 121. This wiper switch 122 is connected to a control unit 123. The control unit 123 controls a motor 124 on the basis of the operation of the wiper switch 122. A position sensor 125 for detecting whether or not the wiper blade 93 is positioned over the obverse surface 65*s* of the window panel 65 is connected to the control unit 123.

When a driver swings the wiper switch 122, this information is conveyed to the control unit 123. The control unit 123 controls the actuating and stopping of the motor 124, and also controls the speed of the motor 124 when the motor 124 is actuated. When the speed of the motor 124 increases, the swinging speed of the wiper blade 93 also rises. When the wiper switch 122 is turned off, the wiper blade 93 stops over the obverse surface 65*s* of the window panel 65. At such time, the wiper blade 93 is not positioned over the obverse surface 45*s* of the secondary window panel 45.

More specifically, the wiper blade 93 stops in the second reversing position R2 (FIG. 7) over the obverse surface 65*s* of the window panel 65. Specifically, the second reversing position R2 can be called the stopping position of the wiper blade 93 when the wiper device 90 is stopped.

Figure 9:
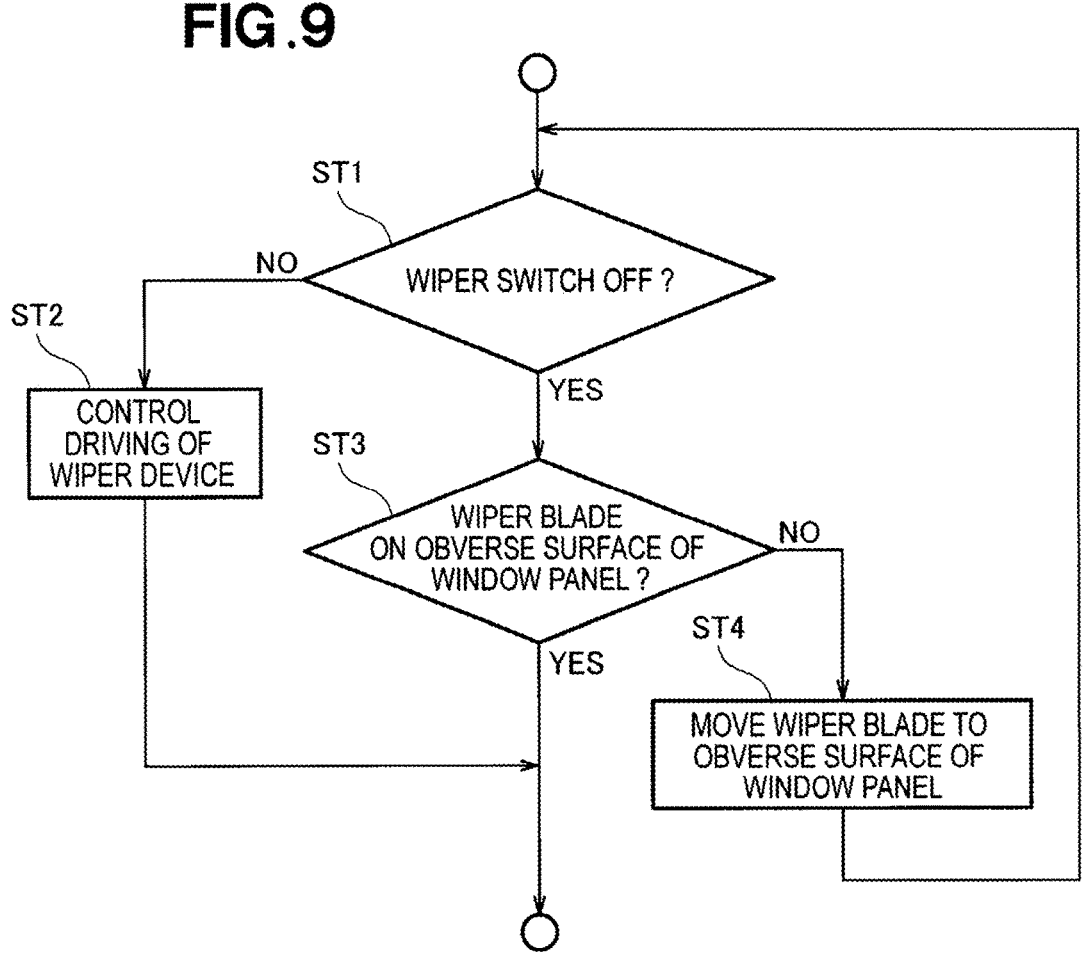
FIG. 9 is a flowchart of the motion of a wiper blade shown in FIG. 8.

As shall be apparent from referring to FIG. 9 as well, in step 1 ("step" shall be referred to below as "ST"), the control unit 123 determines whether the wiper switch 122 is off. In the event that the wiper switch 122 is on (the "NO" branch), the flow proceeds to ST 2. The control unit 123 controls the wiper device 90 (motor 124) in accordance with the operation of the wiper switch 122.

In the event that the wiper switch 122 is off (the "YES" branch), the flow proceeds to ST 3. In this case, the position sensor 125 detects whether the wiper blade 93 is positioned over the obverse surface 65*s* of the window panel 65.

Specifically, the position sensor 125 is positioned above the boundary Bo so as to face toward the boundary Bo. In the event that the wiper blade 93 has not passed over the boundary Bo, the wiper blade 93 is not detected. In this case, the wiper blade 93 is positioned over the obverse surface 65*s* of the window panel 65. In the event that the wiper blade 93 has not passed over the boundary Bo (the "YES" branch), the flow ends.

As shown by the phantom lines in FIG. 8, in the event that the wiper blade 93 has passed over the boundary Bo, the position sensor 125 detects the wiper blade 93. In this case, at least part of the wiper blade 93 has passed over the secondary window panel 45. In the event that at least part of the wiper blade 93 has passed over the secondary window panel 45, the wiper blade 93 will not be positioned over the obverse surface 65*s* of the window panel 65. In this case (the "NO" branch), the flow proceeds to ST 4. The control unit 123 causes the wiper blade 93 to move to the obverse surface 65*s* of the window panel 65.

In accordance with the above, while the wiper device 90 is stopped, the wiper blade 93 is positioned on the window-panel 65 side of the boundary Bo. Specifically, while the wiper device 90 is stopped, the pivot shaft 91 and the wiper blade 93 are both arranged on the window-panel 65 side. For the sake of argument, the pivot shaft 91 is positioned on the window-panel 65 side and the wiper blade 93 is positioned on the secondary window-panel 45 side. In this case the wiper blade 93 could obstruct the movement of the window panel 65 when the window panel 65 is to be caused to move (swing). To prevent such a scenario, the pivot shaft 91 and wiper blade 93 are both arranged on the window-panel 65 side as the same member. Therefore, it is possible to ensure the smooth movement of the window panel 65.

As shall be apparent from referring to FIG. 4, the window panel 65 is supported by a hinge 80 so as to open toward the vehicle exterior, the hinge 80 being provided along the boundary Bo. Providing the hinge 80 along the boundary Bo makes it possible to prevent the secondary window panel 45 from interfering when the window panel 65 has been made to swing. Additionally, setting the wiper blade 93 so as not to span the boundary Bo prevents the wiper blade 93 from interfering with the swinging of the window panel 65, even when the window panel 65 is close to the secondary window panel 45.

Figure 10:
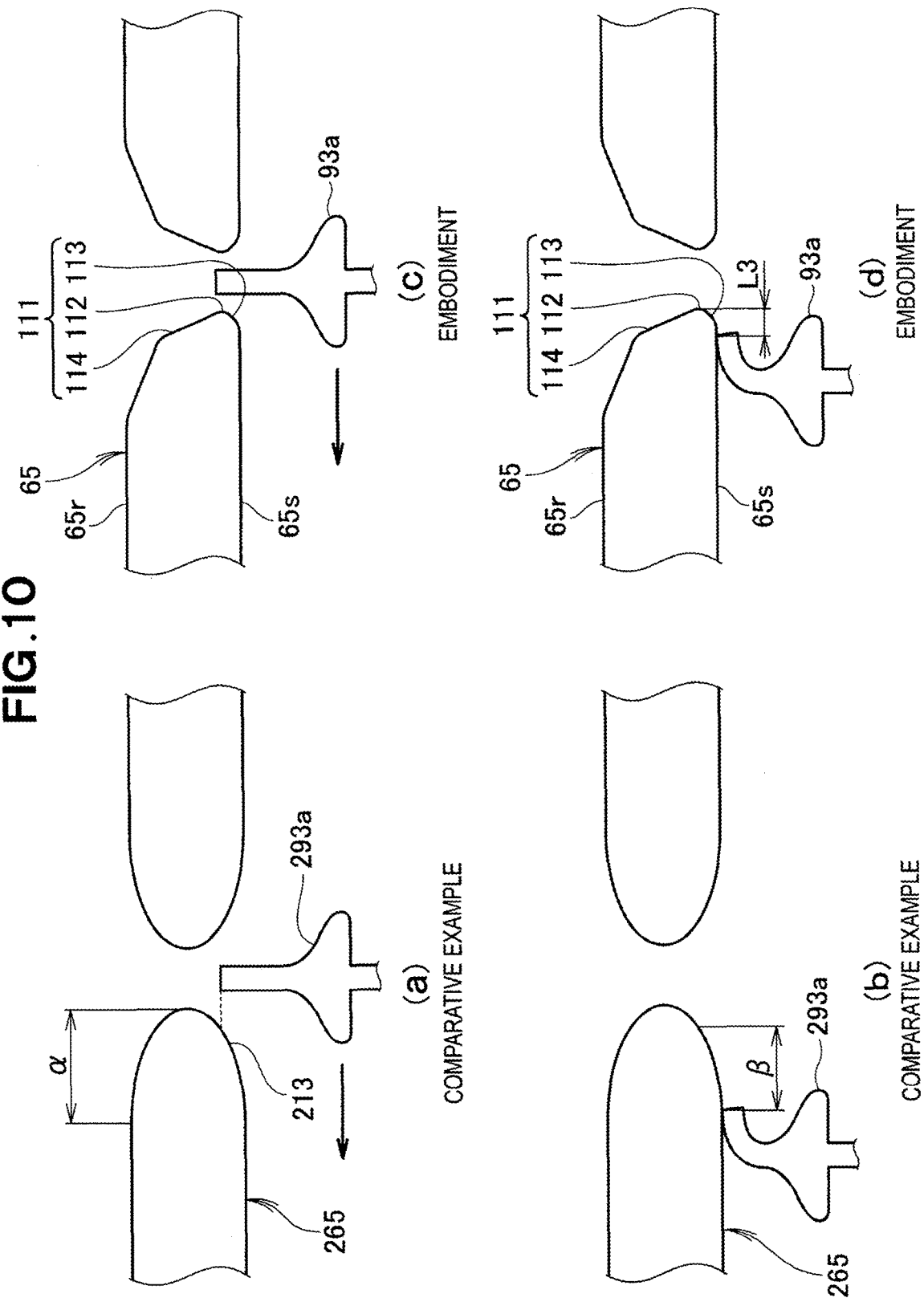
FIG. 10 is a view illustrating an action of the window panel shown in FIG. 6.

As shown in the comparative example in FIG. 10(*a*), when blade rubber 293*a* attached to the leading end of a wiper blade moves toward a window panel 265, the leading end of the blade rubber 293*a* comes into contact with a chamfered portion 213.

As shown in FIG. 10(*b*), the leading end of the blade rubber 293*a* comes into contact with only the length $\beta$ of the length $\alpha$ of the chamfered portion 213. A longer length of contact corresponds to increased wear on the blade rubber 293*a*.

As shown in the embodiments in FIGS. 10(*c*) and 10(*d*) as well as FIG. 6, the window panel leading-end portion 112 is positioned closer to the obverse surface 65*s* of the window panel 65 than is the thickness center C4 of the window panel 65. Additionally, the length L4 of the second chamfered portion 114 extending from the window panel leading-end portion 112 to the reverse surface 65*r* of the window panel 65 is greater than the length L3 of the first chamfered portion 113 extending from the window panel leading-end portion 112 to the obverse surface 65*s* of the window panel 65. The portion from the obverse surface part 65*s* to the reverse surface part 65*r* is formed by the two chamfered portions 113, 114, whereby it is possible to minimize wear on the blade rubber 93*a*.

Furthermore, the window panel leading-end portion 112 is positioned closer to the obverse surface 65*s* of the window panel 65 than is the thickness center C4 of the window panel 65, and the length L3 of the first chamfered portion 113 is less than the length L4 of the second chamfered portion 114; therefore, the length L3 of the blade rubber 93*a* that comes into contact with the edge 111 of the window panel is low. This makes it possible to further minimize wear on the blade rubber 93*a*. Specifically, it is possible to extend the service life of the blade rubber 93*a* of the wiper device 90 having the wiper blade 93 that moves to an outer portion of the window panel 65. This also applies to the secondary window panel leading-end portion 102, which is of the same shape as the window panel leading-end portion 112.

Figure 11:
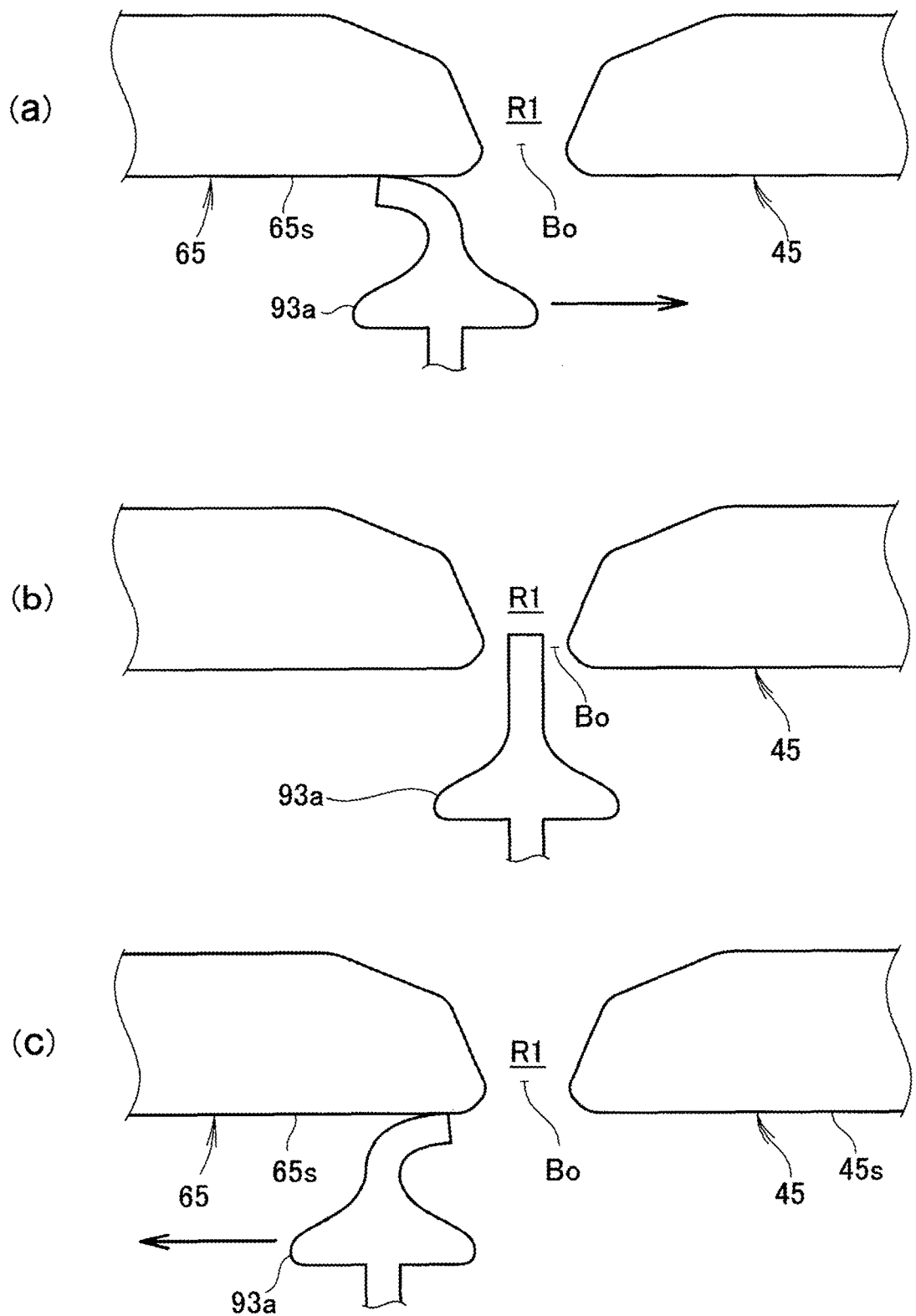
FIG. 11 is a view illustrating an action of the blade rubber attached to the wiper blade shown in FIG. 9 when the blade rubber is reversing direction.

As shown in FIG. 11(a), the blade rubber 93a moves toward the secondary window panel 45 while wiping the obverse surface 65s of the window panel 65. As shown in FIG. 11(b), flexing of the blade rubber 93a is reduced or eliminated at the boundary Bo. At the first reversing position R1, as shown in FIG. 11(c), the blade rubber 93a reverses direction and moves in the direction opposite that shown in FIG. 11(a) while wiping the obverse surface of the window panel 65.

In the first reversing position R1 where the movement direction of the blade rubber 93a (wiper blade) is reversed, it is necessary for the leading end of the blade rubber 93a to reverse direction as well. By having the leading end of the blade rubber 93a not be in contact with the obverse surfaces 65s, 45s of the window panel 65 and the secondary window panel 45, it is possible to easily reverse the direction of the leading end of the blade rubber 93a.

As shall be apparent from referring to FIG. 6, when the wiper blade 93 intersects the boundary Bo, the blade rubber 93a could wear down faster than other locations. However, wear on the blade rubber 93a is minimized by having the end portion of the wiper blade 93 on the pivot-shaft 91 side, which moves the least during the swinging motion, overlap the boundary Bo. However, wear on the blade rubber 93a is minimized by having the end portion of the wiper blade 93 on the pivot-shaft 91 side, which moves the least during the swinging motion, overlap the boundary Bo.

Figure 12:
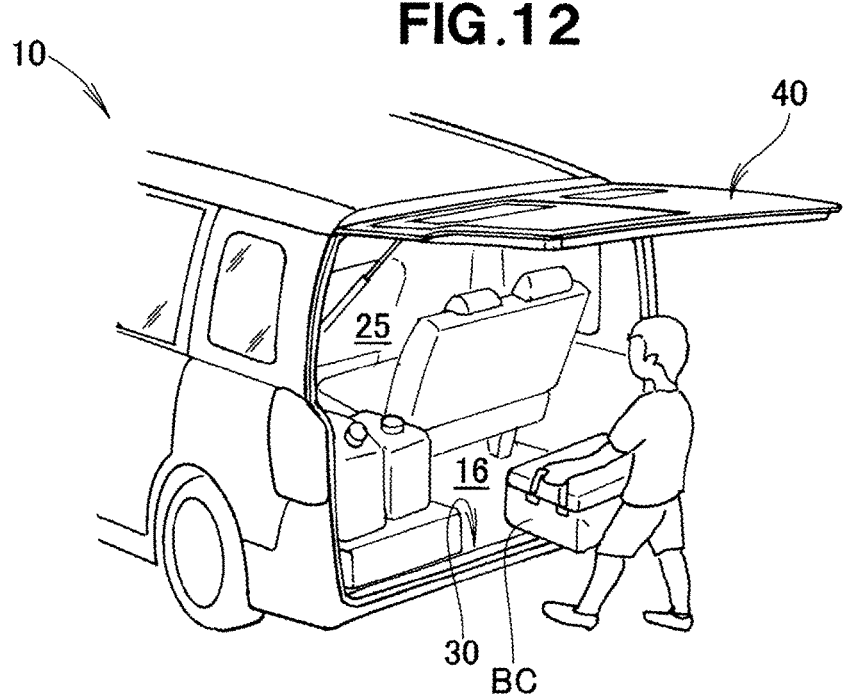
FIG. 12 is a view of a vehicle shown in FIG. 1 when the tailgate thereof is opened.

The operation of the vehicle 10 will be described using FIGS. 12 and 13. As illustrated in FIG. 12, when a large cargo item BC is loaded into the vehicle 10, the tailgate 40 is swung upward. Forming the rear opening 30 across the entire rear face of the vehicle 10 makes it possible to easily load large cargo.

Figure 13:
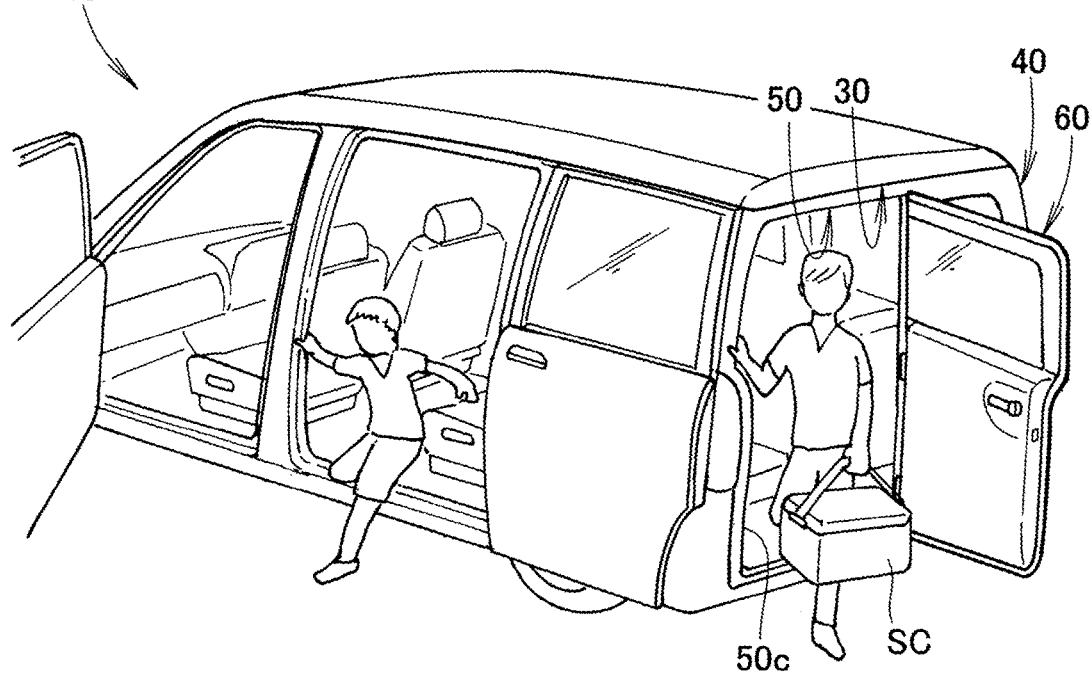
FIG. 13 is a view of the operation when the door illustrated in FIG. 1 is open.

As illustrated in FIG. 13, the rear opening 30 is formed across substantially the entire height range of the rear face of the vehicle 10, and the passenger opening 50 is formed across substantially the entire height range of the tailgate 40. People can enter and exit from the rear part of the vehicle 10 by using the passenger opening 50.

When a small cargo item SC is loaded into the vehicle 10, the door 60 is swung horizontally. The door 60 begins to open from the side edge 50c at an end part in the lateral direction of the passenger opening 50. The door 60 is a portion of the tailgate 40, and is therefore lighter than the tailgate 40. [The door 60] is lighter than the tailgate 40 and is therefore easy to open and close, and has excellent operability.

The operation of the vehicle 10 during travel will be described using FIG. 14. As illustrated by comparative examples in FIG. 14(a), when a pillar 143 extends in the lateral center, the pillar 143 overlaps with the majority of another vehicle OC traveling behind. Due to this majority overlap, it is difficult for a vehicle occupant to see the other vehicle OC in a rear-view mirror 118.

As illustrated by examples in FIG. 14(b), the pillar 43 disposed on the right side (driver's seat side) of the vehicle body blocks a portion of the field of view of the rear-view mirror 18. However, the pillar 43 is placed aside to the right, enabling the other vehicle OC traveling behind the vehicle to be checked in the rear-view mirror 18. This also applies to the boundary Bo overlapping the pillar 43.

As shall be apparent from referring to FIG. 1, the boundary deviates from the lateral-direction center of the vehicle rear surface toward one lateral-direction end. The center of the rear-view mirror 18 offers a clear line-of-sight to a vehicle occupant Mn, and has an appreciable effect on visibility. The deviation of the boundary Bo makes it possible to prevent the boundary Bo from being reflected in the center of the rear-view mirror 18. This makes it possible to achieve an excellent field of view via the rear-view mirror 18.

The operation of the vehicle when backing up will be described using FIG. 15.

The vehicle 10 is sometimes parked by backing up in a store parking lot P, as illustrated in FIG. 15(a), or the vehicle 10 is backed into a location where another vehicle OC is traveling from the side opposite the driver's seat, such as in a highway rest area, as illustrated in FIG. 15(b).

As illustrated in FIG. 15(c) as well, placing the pillar 43 in a location overlapping with the driver's seat makes it possible for the driver to have a wide field of view also when backing the vehicle 10.

The following statements can be made with reference to FIG. 2 as well as to FIGS. 14 and 15 referenced above.

The side edges 50b, 50c of the passenger opening 50 are located away from the lateral center C2 of the vehicle body 11, and the window part 70 is provided at the lateral center position C2 of the tailgate 40. Providing the window part 70 in at least the center position C2 makes it possible to ensure a minimum field of view. Locating the side edges 50b, 50c of the passenger opening 50 away from the window part 70 prevents the side edges 50b, 50c of the passenger opening 50 from obstructing the field of view. Specifically, the vehicle 10 according to the present invention can be considered to be a vehicle in which high visibility can be ensured despite having the door 60 attached thereto.

The window opening 64 is also formed from one end of the door 60 to the other end thereof in the lateral direction, and the secondary window opening 44 is formed so as to span the region of the tailgate 40 in the lateral direction in which the window opening 64 is not formed. Specifically, the window part 70 is formed so as to span in the lateral direction. Forming the window part 70 in a wide range while preventing the side edges 50b, 50c of the passenger opening 50 from obstructing the field of view makes it possible to ensure higher visibility.

The secondary window opening 44 and the window opening 64 are also positioned at substantially the same height in relation to the tailgate 40. Specifically, the secondary window opening 44 and the window opening 64 are formed continuously. A field of view continuous in the height direction can therefore be obtained.

The following statements can also be made with reference to FIG. 1.

The driver's seat 12 is disposed in the vehicle body 11 so as to be offset with respect to the lateral center lines C1, C2, and the pillar 43 (second opening/closing axis 47) is attached in a position overlapping with the driver's seat 12 as viewed from behind the vehicle body 11. Specifically, the pillar 43 (second opening/closing axis 47) is provided in a position overlapping with the driver's seat 12. In the front-rear direction of the vehicle 10, the region overlapping with the driver's seat 12 is difficult for the driver Mn to see. Specifically, the pillar 43 (second opening/closing axis 47) is provided away from regions readily within the field of view of the driver Mn. Leaving locations readily within the field of view of the driver Mn clear makes it possible to ensure a good field of view for the driver Mn.

The side edge 50c of the passenger opening 50 on the lateral-center side is positioned on the driver's seat 12 side relative to the center lines C1, C2. Through this configuration in which the side edge 50c of the passenger opening 50 on the lateral-center side is positioned on the driver's seat 12 side, the boundary between the window opening 64 and the secondary window opening 44 is also positioned on the driver's seat 12 side. Positioning the boundary between the window opening 64 and the secondary window opening 44 in a location behind the driver's seat 12 and not readily visible to the driver Mn makes it possible to ensure a better field of view for the driver Mn.

The operation of the door 60 will be described using FIG. 16.

As illustrated in FIG. 16(a), in a vehicle 200 having only a tailgate 240, the tailgate 240 must always be open when loading cargo. When the tailgate 240 is opened, the tailgate 240 protrudes to the rear of the vehicle by an amount commensurate with the height of the tailgate 240.

Meanwhile, as illustrated in FIG. 16(b), the vehicle 10 according to the present embodiment has the door 60 attached in a portion of the tailgate. The door 60 is attached in a portion of the tailgate 40. When the door 60 is less wide than the tailgate is high, the amount of protrusion of the door 60 to the rear of the vehicle 10 can be reduced by a protrusion difference δ relative to a case in which the tailgate 40 is open. Suppressing the amount of protrusion to the rear of the vehicle 10 makes it possible to suppress interference of objects around the vehicle 10 with the opening and closing of the door 60. Specifically, loading of cargo requires only a small amount of space.

Second Embodiment

Figure 17:
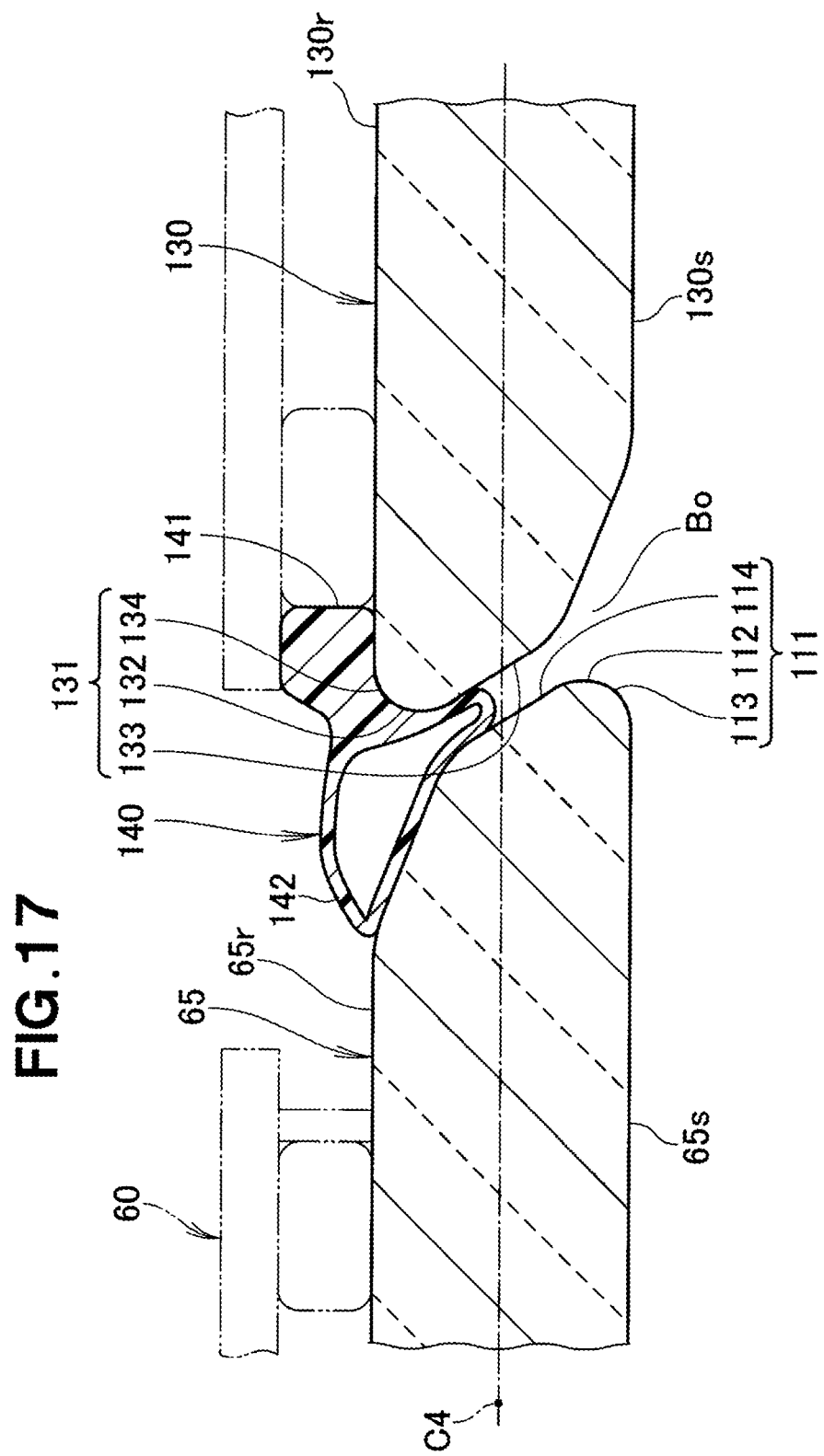
FIG. 17 is a cross-sectional view of a window panel and secondary window panel mounted in the vehicle according to embodiment 2 of the present invention.

A second embodiment of the present invention will next be described with reference to the accompanying drawings. FIG. 17 shows a cross-sectional configuration of a window panel and a secondary window panel mounted in a vehicle in the second embodiment; the elements represented correspond to those in the first embodiment as shown in FIG. 6.

As shown in FIG. 17, the edge 131 of the secondary window panel 130 includes a secondary window panel leading-end portion 132 located closest to the window panel 65, a third chamfered portion 133 extending from the secondary window panel leading-end portion 132 to the obverse surface 130s of the secondary window panel 130, and a fourth chamfered portion 134 extending from the secondary window panel leading-end portion 132 to the reverse surface 130r of the secondary window panel 130. The secondary window panel leading-end portion 132 is positioned closer to the reverse surface 130r of the secondary window panel 130 than is the thickness-direction center C4 of the window panel 65. The length of the fourth chamfered portion 134 is less than the length of the third chamfered portion 133 with respect to the direction along the obverse 130s of the secondary window panel 130.

A seal member 140 is provided from the reverse surface 130r of the secondary window panel 130 across to the reverse surface 65r of the window panel 65. The seal member 140 includes an attachment base part 141 attached to the reverse surface 130r of the secondary window panel 130, and a seal lip 142 extending integrally from the attachment base part 141 toward the window panel 65. The leading end of the seal lip 142 is arranged closer to the secondary window panel 130 than is an end of a vehicle door 60 attached to the reverse surface 65r of the window panel 65.

It is possible to cause the window panel leading-end portion 112 and the secondary window panel leading-end portion 132 to overlap in a direction orthogonal to the window panel 65. This makes it possible to achieve a labyrinth structure, and to suppress the infiltration of water from the vehicle exterior.

Furthermore, a seal member 140 is provided from the reverse surface 130r of the secondary window panel 130 across to the reverse surface 65r of the window panel 65. This makes it possible to obstruct the gap Bo between the window panel 65 and the secondary window panel 130. It is possible to more reliably suppress the infiltration of water from the vehicle exterior.

Additionally, the seal lip 142 is extended toward the long second chamfered portion 114. This makes it possible to, e.g., arrange the seal lip 142 and an outer panel of the vehicle door 60 in an aligned manner, and to ensure the length of the seal lip 142 while reducing the thickness of the window panel 65.

Furthermore, the window panel leading-end portion 112 is positioned closer to the obverse surface 65s of the window panel 65, and the secondary window panel leading-end portion 132 is positioned closer to the reverse surface 130r of the secondary window panel 130. Interference by the secondary window panel leading-end portion 132 during opening or closing of the vehicle door 60 is prevented by having the window panel 65 be displaced toward the vehicle exterior. Therefore, it is unnecessary to displace the secondary window panel 130 when displacing the window panel 65. This facilitates the operation for displacing the window panel 65.

The vehicle according to the present invention is described above using a right-hand-drive vehicle as an example, but the present invention is also applicable to a left-hand-drive vehicle. In this case, a passenger opening and a door may be provided in substantially the right half of the rear part of the vehicle, and the door thereby configured so as to open from the end part on the opposite side from the driver's seat, or the configuration may be otherwise changed as appropriate. The modes described above do not limit the present invention.

INDUSTRIAL APPLICABILITY

The vehicle of the present invention is suitable as a van-type vehicle.

KEY TO SYMBOLS

10: Vehicle
11: Vehicle body
30: First door opening
40: First door
44: Secondary window opening
45, 130: Secondary window panel (adjacent panel)
45s, 130s: Obverse surface (of secondary window panel)
45r, 130r: Reverse surface (of secondary window panel)
50: Second door opening
60: Second door
64: Window opening
65: Window panel
65s: Obverse surface (of window panel)
65r: Reverse surface (of window panel)
80: Hinge
90: Wiper device
93: Wiper blade
101: Edge (of secondary window panel)
102, 132: Secondary window panel leading-end portion
103, 133: Third chamfered portion
104, 134: Fourth chamfered portion
111: Edge (of window panel)
112: Window panel leading-end portion
113: First chamfered portion 114: Second chamfered portion
140: Seal member
141: Attachment base part
142: Seal lip
Bo: Boundary
C4: Thickness center (of window panel)
L1: Length of window opening in lateral direction (adjoining direction)
L2: Length of secondary window opening in lateral direction (adjoining direction)
L3: Length of first chamfered portion
L4: Length of second chamfered portion
L5: Length of third chamfered portion
L6: Length of fourth chamfered portion
R1: First reversing position
R2: Second reversing position

The invention claimed is:

1. A vehicle comprising:
a window opening and a secondary window opening formed in a vehicle body so as to be adjacent to each other;
a window panel for covering the window opening;
a secondary window panel for covering the secondary window opening; and
a wiper device for wiping both the window panel and the secondary window panel,
the wiper device having a wiper blade capable of crossing a boundary between the window panel and the secondary window panel and continuously wiping from the window panel to the secondary window panel,
wherein the wiper blade reverses direction at two reversing positions, including a first reversing position and a second reversing position, and reciprocates between these two reversing positions,
a gap between the window panel and the secondary window panel is larger than a leading end of a blade rubber provided with the wiper blade so that the leading end of the blade rubber does not contact with each surface of the window panel and the secondary window panel in the first reversing position, and
in the first reversing position, a part of the blade rubber overlaps the boundary.

2. The vehicle as in claim 1, wherein:
a length of the window opening in an adjoining direction is greater than a length of the secondary window opening in the adjoining direction, where the adjoining direction is defined as a direction extending from the window opening toward the secondary window opening; and
the wiper blade further has a pivot shaft of the wiper blade, the pivot shaft being positioned on the window opening side of the boundary.

3. The vehicle as in claim 2, wherein the window opening and the secondary window opening are formed on a rear surface of the vehicle body so as to be laterally adjoining, the boundary deviating from a lateral-direction center toward one lateral-direction end.

4. The vehicle as in claim 3, wherein the pivot shaft is provided at a location on a side of the boundary toward the lateral-direction center.

5. The vehicle as in claim 2, wherein wiper blade is set to such a length as to span a visible portion of the secondary window panel, where the visible portion is defined as a portion of the secondary window panel where a vehicle interior is visible from a vehicle exterior.

6. The vehicle as in claim 2, wherein the window panel is provided so as to be movable relative to the secondary window panel, and, while the wiper device is stopped, the wiper blade is positioned on a window-panel side of the boundary.

7. The vehicle as in claim 6, wherein the window panel is supported by a hinge so as to open toward a vehicle exterior, the hinge being provided along the boundary.

8. A vehicle comprising:
a window opening and a secondary window opening formed in a vehicle body so as to be adjacent to each other;
a window panel for covering the window opening;
a secondary window panel for covering the secondary window opening; and
a wiper device for wiping both the window panel and the secondary window panel,
the wiper device having a wiper blade capable of crossing a boundary between the window panel and the secondary window panel and continuously wiping from the window panel to the secondary window panel,
wherein:
an edge of the window panel includes a window panel leading-end portion positioned closer to an obverse surface of the window panel than is a thickness-direction center of the window panel such that the window panel leading-end portion is closest to the secondary window panel, a first chamfered portion extending from the window panel leading-end portion to the obverse surface of the window panel, and a second chamfered portion extending from the window panel leading-end portion to a reverse surface of the window panel; and
a length of the second chamfered portion is greater than a length of the first chamfered portion with respect to a direction along the obverse surface of the window panel.

9. A vehicle comprising:
a window opening and a secondary window opening formed in a vehicle body so as to be adjacent to each other;
a window panel for covering the window opening;
a secondary window panel for covering the secondary window opening; and
a wiper device for wiping both the window panel and the secondary window panel,
the wiper device having a wiper blade capable of crossing a boundary between the window panel and the secondary window panel and continuously wiping from the window panel to the secondary window panel,
wherein:
an edge of the window panel includes a window panel leading-end portion positioned closer to an obverse surface of the window panel than is a thickness-direction center of the window panel such that the window panel leading-end portion is closest to the secondary window panel, a first chamfered portion extending from the window panel leading-end portion to the obverse surface of the window panel, and a second chamfered portion extending from the window panel leading-end portion to a reverse surface of the window panel;
a length of the second chamfered portion is greater than a length of the first chamfered portion with respect to a direction along the obverse surface of the window panel,
an edge of the secondary window panel has a secondary window panel leading-end portion positioned closer to an obverse surface of the secondary window panel than is a thickness-direction center of the secondary window panel such that the secondary window panel leading-end portion is closest to the window panel, a third chamfered portion extending from the secondary window panel leading-end portion to the obverse surface of the secondary window panel, and a fourth chamfered portion extending from the secondary window panel leading-end portion to a reverse surface of the secondary window panel; and a length of the fourth chamfered portion is greater than a length of the third chamfered portion with respect to a direction along the obverse surface of the secondary window panel.

10. The vehicle as in claim 8, wherein:

an edge of the secondary window panel has a secondary window panel leading-end portion positioned closer to a reverse surface of the secondary window panel than is a thickness-direction center of the secondary window panel such that the secondary window panel leading-end portion is closest to the window panel, a third chamfered portion extending from the secondary window panel leading-end portion to an obverse surface of the secondary window panel, and a fourth chamfered portion extending from the secondary window panel leading-end portion to the reverse surface of the secondary window panel; and a length of the fourth chamfered portion is less than a length of the third chamfered portion with respect to a direction along the obverse surface of the secondary window panel.

11. The vehicle as in claim 10, wherein a seal member is provided from the reverse surface of the secondary window panel across to the reverse surface of the window panel, the seal member including an attachment base part attached to the reverse surface of the secondary window panel, and a seal lip extending integrally from the attachment base part toward the window panel, and a leading end of the seal lip being arranged closer to the secondary window panel than is an end of an attached member attached to the reverse surface of the window panel.

12. The vehicle as in claim 10, wherein the window panel is provided to the vehicle body so as to be displaceable relative to the thickness direction of the secondary window panel.

13. The vehicle as in claim 8, wherein:
a first door opening is formed in the vehicle body, a first door for opening and closing the first door opening being attached to the vehicle body;
a second door opening is formed in the first door, a second door for opening and closing the second door opening being attached to the first door;
the window panel is attached to the second door; and
the secondary window opening is formed in the first door.

* * * * *